United States Patent
Hironobu et al.

(10) Patent No.: US 11,339,739 B2
(45) Date of Patent: May 24, 2022

(54) CONTROL APPARATUS FOR INTERNAL COMBUSTION ENGINE

(71) Applicant: Honda Motor Co., Ltd., Tokyo (JP)

(72) Inventors: Hidekazu Hironobu, Wako (JP); Ryuichi Hata, Wako (JP); Daiki Yamazaki, Wako (JP); Masatoshi Nakajima, Wako (JP); Nobuaki Ito, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/215,207

(22) Filed: Mar. 29, 2021

(65) Prior Publication Data

US 2021/0301752 A1     Sep. 30, 2021

(30) Foreign Application Priority Data

Mar. 31, 2020 (JP) .............................. JP2020-065392

(51) Int. Cl.
*F01N 3/00* (2006.01)
*F02D 41/30* (2006.01)
(Continued)

(52) U.S. Cl.
CPC ....... *F02D 41/3017* (2013.01); *F02D 41/024* (2013.01); *F02D 41/1497* (2013.01);
(Continued)

(58) Field of Classification Search
CPC .......... F01N 3/02; F01N 3/027; F01N 3/0275; F01N 3/2013
See application file for complete search history.

(56) References Cited

U.S. PATENT DOCUMENTS

2021/0301744 A1* 9/2021 Hata .................... F02D 41/2422
2021/0301745 A1* 9/2021 Nakajima ............. F02D 41/182
(Continued)

FOREIGN PATENT DOCUMENTS

JP       2004028031 A    1/2004
JP       2009103096 A    5/2009
(Continued)

OTHER PUBLICATIONS

Japanese Office action; Application 2020065392; dated Dec. 7, 2021.

*Primary Examiner* — John Kwon
(74) *Attorney, Agent, or Firm* — Duft & Bornsen, PC

(57) ABSTRACT

An internal combustion engine control apparatus including a microprocessor. The microprocessor is configured to perform determining whether a start of the internal combustion engine is complete, determining whether a warm-up of an exhaust catalyst device is needed, acquiring an information on a temperature inside a cylinder, switching an injection mode, and controlling the fuel injector to inject the fuel in accordance with the injection mode, the switching including switching the injection mode to the first injection mode when the start of the internal combustion engine is complete and the warm-up of the exhaust catalyst device is needed, and switching the injection mode to the second injection mode or the third injection mode in accordance with the information on the temperature when the start of the internal combustion engine is complete and the warm-up of the exhaust catalyst device is not needed.

17 Claims, 23 Drawing Sheets

(51) Int. Cl.
  *F02D 41/02*  (2006.01)
  *F02D 41/14*  (2006.01)
  *F02D 41/40*  (2006.01)
  *F02D 41/38*  (2006.01)

(52) U.S. Cl.
  CPC ...... *F02D 41/402* (2013.01); *F02D 2041/389* (2013.01); *F02D 2200/101* (2013.01)

(56) References Cited

U.S. PATENT DOCUMENTS

| | | | |
|---|---|---|---|
| 2021/0301746 A1* | 9/2021 | Nakajima | F02D 41/182 |
| 2021/0301747 A1* | 9/2021 | Nakajima | F02D 35/025 |
| 2021/0301751 A1* | 9/2021 | Hironobu | F02P 5/152 |
| 2021/0301753 A1* | 9/2021 | Hironobu | F02P 5/152 |
| 2021/0301755 A1* | 9/2021 | Hata | F02D 41/402 |

FOREIGN PATENT DOCUMENTS

| | | | |
|---|---|---|---|
| JP | 2017150385 A | | 8/2017 |
| JP | 2018071485 A | | 5/2018 |

\* cited by examiner

CONTROL APPARATUS FOR INTERNAL COMBUSTION ENGINE

CROSS-REFERENCE TO RELATED APPLICATION

This application is based upon and claims the benefit of priority from Japanese Patent Application No. 2020-065392 filed on Mar. 31, 2020, the content of which is incorporated herein by reference.

BACKGROUND OF THE INVENTION

Field of the Invention

This invention relates to a control apparatus for an internal combustion engine which controls an operation of a direct-injection internal combustion engine.

Description of the Related Art

As this type of apparatuses, there are known apparatuses that are configured to switch the fuel injection mode in accordance with an exhaust purification catalyst warm-up request. Such an apparatus is described in, for example, Japanese Unexamined Patent Publication No. 2004-028031 (JP2004-028031A). When the engine is started and then an exhaust purification catalyst warm-up request is made, the apparatus of JP2004-028031A switches the injection mode to a mode in which split injection is performed in the intake stroke and compression stroke; after warm-up of a catalyst is complete, this apparatus switches the injection mode to a mode in which injection is performed in the intake stroke.

However, warm-up of the catalyst may not be required. In this case, soot may adhere to the crown surface of the piston, or the like.

SUMMARY OF THE INVENTION

An aspect of the present invention is a control apparatus for an internal combustion engine, the internal combustion engine including a piston reciprocating in a cylinder and a fuel injector arranged to inject a fuel into a combustion chamber facing the piston in the cylinder. The apparatus includes an electronic control unit having a microprocessor and a memory. The microprocessor is configured to perform: determining whether a start of the internal combustion engine is complete; determining whether a warm-up of an exhaust catalyst device disposed on an exhaust passage of the internal combustion engine is needed; acquiring an information on a temperature inside the cylinder; switching an injection mode to one of a first injection mode injecting the fuel in a first manner to warm-up the exhaust catalyst device, a second injection mode injecting the fuel in a second manner different from the first manner, a third injection mode injecting the fuel in a third manner different from the first manner and the second manner; and controlling the fuel injector to inject the fuel in accordance with the injection mode, the switching including switching the injection mode to the first injection mode when it is determined that the start of the internal combustion engine is complete and it is determined that the warm-up of the exhaust catalyst device is needed, and switching the injection mode to the second injection mode or the third injection mode in accordance with the information on the temperature when it is determined that the start of the internal combustion engine is complete and it is determined that the warm-up of the exhaust catalyst device is not needed.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention will be described with reference to FIGS. 1 to 27. An internal combustion engine control apparatus according to the embodiment of the present invention is applied to vehicles including a direct-injection gasoline engine as an internal combustion engine. Specifically, this internal combustion engine control apparatus is applied to engine vehicles that travel using only an engine as a drive source and hybrid vehicles that travel using an engine and a motor as drive sources. Hereafter, an example will be described in which this internal combustion engine control apparatus is applied to a hybrid vehicle.

Figure 1:
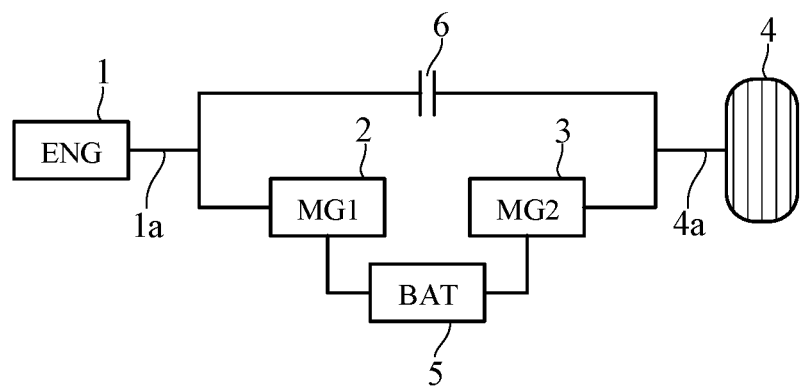
FIG. 1 is a drawing schematically showing the configuration of a travel drive unit of a hybrid vehicle to which an internal combustion engine control apparatus according to an embodiment of the present invention is applied.

FIG. 1 is a drawing schematically showing the configuration of the travel drive unit of the hybrid vehicle to which the internal combustion engine control apparatus according to the embodiment of the present invention is applied. As shown in FIG. 1, a first motor-generator (MG1) 2 is connected to the output shaft 1a of an engine (ENG) 1, and a second motor-generator (MG2) 3 is connected to the rotation shaft 4a of a drive wheel 4. The first motor-generator 2 mainly serves as a generator that generates power when driven by the engine 1, and the power generated by the first motor-generator 2 is accumulated in a battery (BAT) 5 through an inverter (not shown). The second motor-generator 3 mainly serves as a travel motor that is driven by power supplied from the battery 5 through an inverter (not shown).

A clutch 6 is interposed between the output shaft 1a of the engine 1 and the rotation shaft 4a of the drive wheel 4, and the output shaft 1a and rotation shaft 4a are connected or disconnected through the clutch 6. When the output shaft 1a and rotation shaft 4a are disconnected, the vehicle travels by only the power of the second motor-generator 3 (EV travel). When the output shaft 1a and rotation shaft 4a are connected through the clutch 6, the vehicle travels by only the power of the engine 1 (engine travel) or travels by the power of the engine 1 and second motor-generator 3 (hybrid travel). In other words, the vehicle is able to switch the travel mode among an EV mode, in which EV travel is performed, an engine mode, in which engine travel is performed, and a hybrid mode, in which hybrid travel is performed.

Figure 2:
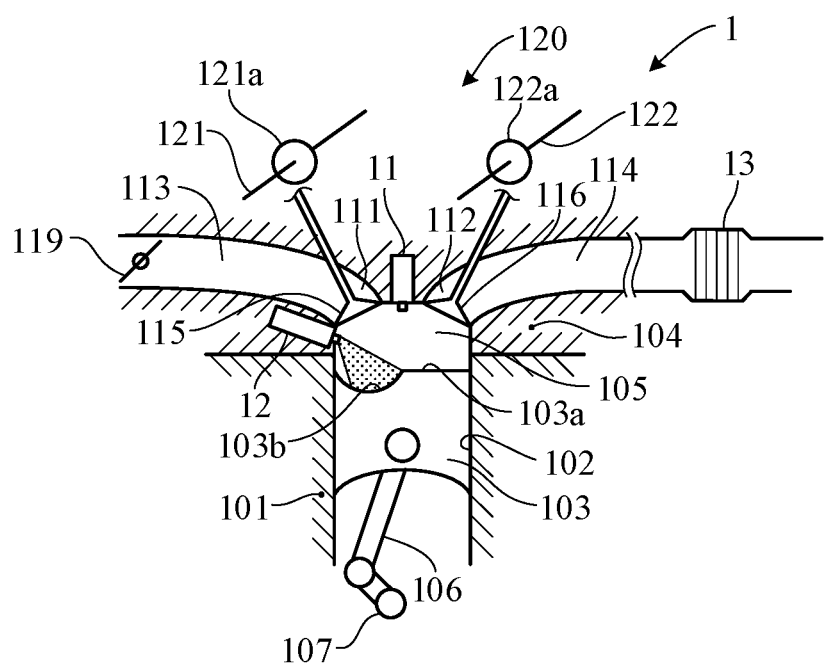
FIG. 2 is a drawing schematically showing a configuration of main components of an engine of FIG. 1.

FIG. 2 is a drawing schematically showing the configuration of main components of the engine 1. The engine 1 is a spark-ignition internal combustion engine having a fuel cut function of stopping supply of fuel to multiple cylinders during deceleration or the like of the vehicle and is a four-stroke engine, which goes through four strokes consisting of intake, compression, expansion and exhaust in one operation cycle. For convenience, the operation from the start of the intake stroke to the end of the exhaust stroke is referred to as "one cycle of the combustion stroke of the engine," or simply as "one cycle." Although the engine 1 includes multiple cylinders, such as four, six, or eight ones, the configuration of one cylinder is shown in FIG. 2. The cylinders have the same configuration.

As shown in FIG. 2, the engine 1 includes a cylinder 102 formed in a cylinder block 101, a piston 103 disposed slidably in the cylinder 102, and a combustion chamber 105 formed between the crown surface 103a of the piston 103 (piston crown surface) and a cylinder head 104. For example, a recess 103b is formed in the piston crown surface 103a so as to be along a tumble flow in the cylinder. The piston 103 is connected to a crankshaft 107 through a connecting rod 106 and rotates the crankshaft 107 (corresponding to the output shaft 1a of FIG. 1) by reciprocating of the piston 103 along the inner wall of the cylinder 102.

The cylinder head 104 is provided with an intake port 111 and an exhaust port 112. An intake passage 113 communicates with the combustion chamber 105 through the intake port 111, while an exhaust passage 114 communicates with the combustion chamber 105 through the exhaust port 112. The intake port 111 is opened and closed by an intake valve 115, and the exhaust port 112 is opened and closed by an exhaust valve 116. A throttle valve 119 is disposed on the upstream side of the intake passage 113 connected to the intake valve 115. The throttle valve 119 consists of, for example, a butterfly valve, and the amount of intake air supplied to the combustion chamber 105 is controlled by the throttle valve 119. The intake valve 115 and exhaust valve 116 are open and close driven by a valve train 120.

An ignition plug 11 and a direct-injection injector 12 are mounted on the cylinder head 104 so as to face the combustion chamber 105. The ignition plug 11 is disposed between the intake port 111 and exhaust port 112 and ignites a fuel-air mixture in the combustion chamber 105 by producing a spark by electrical energy.

The injector 12 is disposed near the intake valve 115 and injects fuel when driven by electrical energy. More specifically, the high-pressure fuel is supplied from a fuel tank to the injector 12 through a fuel pump, and the injector 12 converts the fuel into high fine particles and injects the resulting fuel into the combustion chamber 105 obliquely downward at a predetermined timing. The injector 12 may be disposed otherwise and may be disposed, for example, near the ignition plug 11.

The valve train 120 includes an intake cam shaft 121 and an exhaust cam shaft 122. The intake cam shaft 121 integrally includes intake cams 121a corresponding to the cylinders (cylinders 102), and the exhaust cam shaft 122 integrally includes exhaust cams 122a corresponding to the cylinders. The intake cam shaft 121 and exhaust cam shaft 122 are connected to the crankshaft 107 through timing belts (not shown) and rotate once each time the crankshaft 107 rotates twice.

The intake valve 115 is opened and closed by rotation of the intake cam shaft 121 through an intake rocker arm (not shown) at a predetermined timing corresponding to the profile of the intake cam 121a. The exhaust valve 116 is opened and closed by rotation of the exhaust cam shaft 122 through an exhaust rocker arm (not shown) at a predetermined timing corresponding to the profile of the exhaust cam 122a.

A catalyst device 13 for purifying exhaust gas is disposed on the exhaust passage 114. The catalyst device 13 is a device including a three-way catalyst having a function of removing and purifying HC, CO, and NOx contained in exhaust gas by oxidation and reduction. Other types of catalyst, such as an oxidation catalyst that oxidizes CO and HC in exhaust gas, may be used. When the temperature of the catalyst included in the catalyst device 13 is increased, the catalyst is activated, resulting in an increase in the exhaust gas purification effect of the catalyst device 13.

To improve fuel efficiency, the engine 1 has a fuel cut function of stopping fuel injection from the injector 12 when predetermined fuel cut conditions are satisfied during engine travel. That is, when the fuel cut conditions are satisfied, the mode is switched (referred to as the "F/C mode") and thus fuel injection is stopped. For example, the fuel cut conditions are as follows: the manipulated variable of the accelerator pedal (accelerator opening) is equal to or smaller than a predetermined value; the rotational speed of the crankshaft 107 (engine speed) is equal to or greater than a predetermined value; and the vehicle speed is equal to or greater than a predetermined value. These fuel cut conditions are satisfied, for example, during deceleration travel. In the F/C mode, intake of air into the combustion chamber 105 is continued.

Also, to improve fuel efficiency, the engine 1 has an idling stop function of stopping fuel injection from the injector 12 when predetermined idling stop conditions are satisfied. Specifically, when the idling stop conditions are satisfied, the mode is switched to an idling stop mode (referred to as the "I/S mode") and thus fuel injection is stopped. For example, the idling stop conditions are as follows: the vehicle speed is equal to or lower than a predetermined vehicle speed during a stop or the like of the vehicle; the accelerator pedal is not in operation; and the operation of a brake pedal is detected. In the I/S mode, the engine 1 is stopping, and intake of air into the combustion chamber 105 is stopped, as during EV travel.

Although not shown, the engine 1 includes an exhaust gas recirculator that recirculates a part of exhaust gas to an intake system, a blow-by gas return device that returns blow-by gas to the intake system and burns it again, a purge controller that controls supply of evaporative fuel gas in a fuel tank to the intake system, and the like. The exhaust gas recirculator includes an internal EGR that recirculates exhaust gas in the combustion chamber 105 under the control of the valve train 120 and an external EGR that guides a part of exhaust gas from the exhaust passage 114 to the intake system through an EGR passage and an EGR valve. The purge controller includes a purge passage through which evaporative fuel gas in the fuel tank is guided to the intake system and a purge valve that is disposed on the purge passage and controls the flow of gas passing through the purge passage. The engine 1 may include a supercharger.

Figure 3:
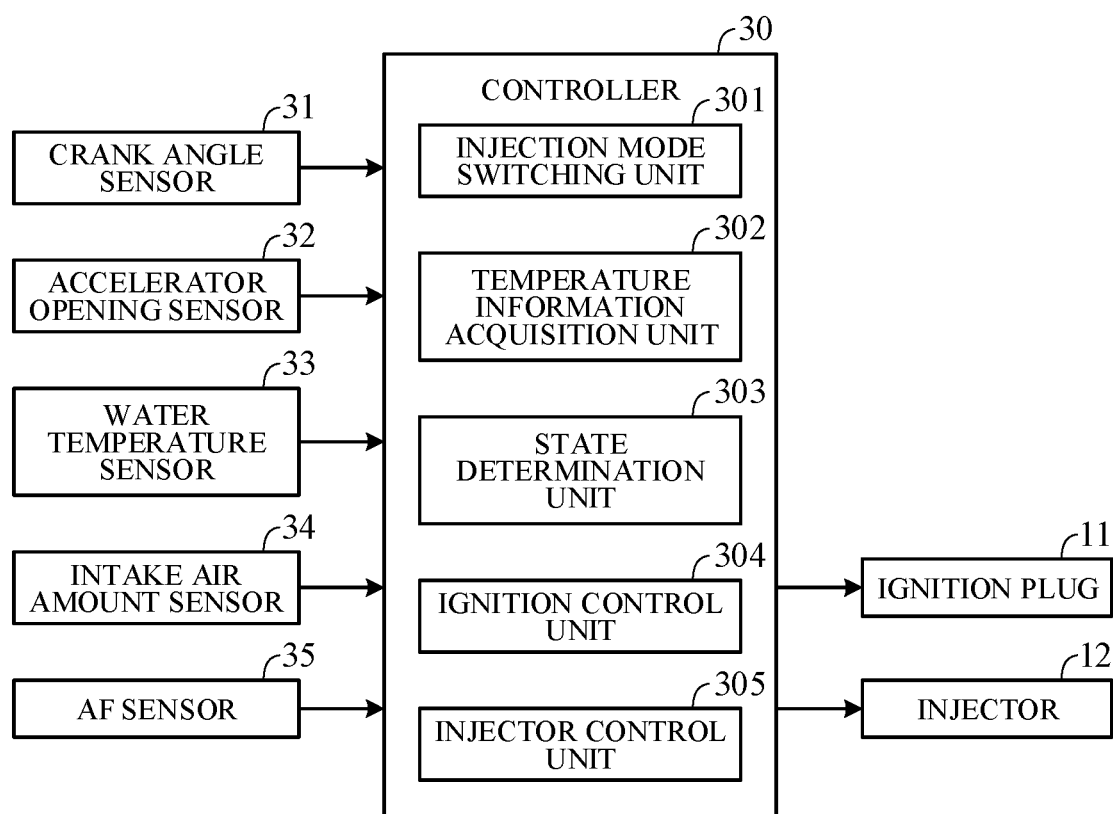
FIG. 3 is a block diagram showing the configuration of main components of the internal combustion engine control apparatus according to the embodiment of the present invention.

FIG. 3 is a block diagram showing the configuration of main components of the internal combustion engine control apparatus according to the embodiment of the present invention. As shown in FIG. 3, the internal combustion engine control apparatus is formed centered on a controller 30 for controlling the engine and includes various types of sensors, actuators, and the like connected to the controller 30. Specifically, a crank angle sensor 31, an accelerator opening sensor 32, a water temperature sensor 33, an intake air amount sensor 34, an AF sensor 35, the ignition plug 11, and the injector 12 are connected to the controller 30.

The crank angle sensor 31 is disposed on the crankshaft 107 and configured to output pulse signals in association with rotation of the crankshaft 107. The controller 30 identifies the rotation angle of the crankshaft 107 (crank angle) with respect to the position of the top dead center (TDC) of the piston 103 at the start of the intake stroke and calculates the engine RPM (engine speed) on the basis of pulse signals from the crank angle sensor 31.

The accelerator opening sensor 32 is disposed on the acceleration pedal (not shown) of the vehicle and detects the manipulated variable of the acceleration pedal (accelerator opening). A command indicating the target torque of the engine 1 is issued on the basis of the value detected by the accelerator opening sensor 32. The water temperature sensor 33 is disposed on a passage through which engine cooling water for cooling the engine 1 flows and detects the temperature of the engine cooling water (cooling water temperature). The intake air amount sensor 34 is a sensor that detects the amount of intake air and consists of, for example, an air flow meter disposed on the intake passage 113 (more specifically, on the upstream side of the throttle valve). The AF sensor 35 is disposed on the exhaust passage 114 and on the upstream side of the catalyst device 13 and detects the air-fuel ratio of exhaust gas in the exhaust passage 114.

The controller 30 consists of an electronic control unit (ECU) and includes a computer including an arithmetic processing unit, such as a CPU, a storage unit, such as a ROM or RAM, and other peripheral circuits. The controller 30 includes, as functional elements, an injection mode switching unit 301, a temperature information acquisition unit 302, a state determination unit 303, an ignition control unit 304, and an injector control unit 305.

Figure 4:
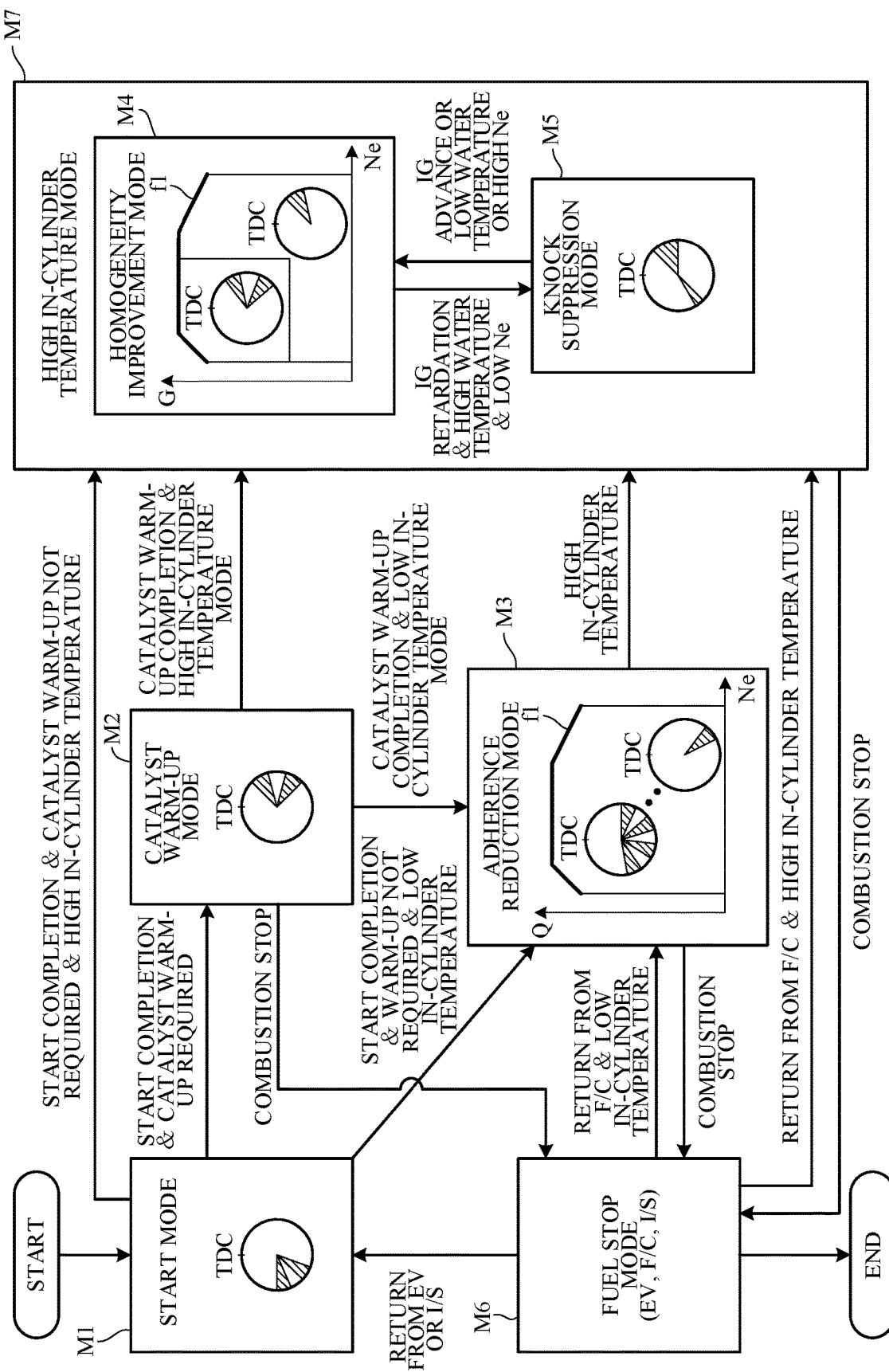
FIG. 4 is a diagram showing an example of switching of injection modes in the internal combustion engine control apparatus according to the embodiment of the invention.

The injection mode switching unit 301 switches the injection mode in accordance with the operation state of the engine 1. FIG. 4 is a diagram showing an example of switching of the injection mode in the period from when the operation of the engine 1 is started in response to turn-on of an ignition switch until the operation of the engine 1 is ended in response to turn-off of the ignition switch. As shown in FIG. 4, the injection mode includes a start mode M1, a catalyst warm-up mode M2, an adherence reduction mode M3, a homogeneity improvement mode M4, a knock suppression mode M5, and a fuel stop mode M6. The homogeneity improvement mode M4 and knock suppression mode M5 represent high in-cylinder temperature states, in which the piston temperature (in-cylinder temperature) is high, and are collectively referred to as the "high in-cylinder temperature mode M7."

In the modes M1 to M5 other than the fuel stop mode in FIG. 4, the crank angle in a range from the start of the intake stroke (the intake top dead center (TDC)) to the end of the compression stroke (the compression top dead center (TDC)) is represented by the angle of a clockwise circle using the intake top dead center (TDC) as the start point, and the fuel injection timing is represented by a hatched sector extending radially from the center of the circle. In the intake stroke, the crank angle is in a range equal to or greater than 0° and equal to or smaller than 180°; in the compression stroke, the crank angle is in a range equal to or greater than 1800 and equal to or smaller than 360. Hereafter, a crank angle range from 0° to 90° may be referred to as the first half of the intake stroke, a crank angle range from 900 to 1800 as the second half of the intake stroke, a crank angle range from 1800 to 2700 as the first half of the compression stroke, and a crank angle range from 2700 to 3600 as the second half of the compression stroke.

The start mode M1 is a mode for starting the engine 1 and is performed immediately after the ignition switch is turned on, or when the mode is restored from the EV mode or I/S mode. In the start mode M1, the engine 1 is cranked and then a mixture is produced by injecting the fuel twice in the first half of the compression stroke, that is, by two-injection compression, as shown in FIG. 4. In this case, the same amount of fuel is injected each time. By injecting the fuel in the compression stroke, the startability of the engine 1 is improved. Also, by injecting the fuel multiple times (in multiple stages) in the first half of the compression stroke, the amount of each fuel injection is suppressed. This allows for suppressing adherence of the fuel to the piston crown surface 103a or the wall surface of the cylinder 102 and thus suppressing soot formation.

As long as both an improvement in the startability and suppression of soot are achieved, the start mode M1 is not limited to two-injection compression and may be a different injection mode, such as one in which the fuel is injected once in the compression stroke (one-injection compression) or one in which the fuel is injected multiple times in the intake stroke and compression stroke (multiple-injection intake-compression). When the start mode M1 is complete, the injection mode is switched to one of the catalyst warm-up mode M2, adherence reduction mode M3, and high in-cylinder temperature mode M7 (e.g., homogeneity improvement mode M4).

The catalyst warm-up mode M2 is a mode for promoting warm-up of the catalyst device 13 to activate the catalyst earlier. In the catalyst warm-up mode M2, a mixture is produced by injecting the fuel twice in the intake stroke, that is, by two-injection intake, as shown in FIG. 4. In this case, the same amount of fuel is injected each time. Also, in the catalyst warm-up mode M2, the timing at which the mixture is ignited by the ignition plug 11 is retarded from the MBT (minimum advance for the best torque), at which the best torque is obtained. The retardation of the ignition timing causes the mixture to be burnt later and thus increases the amount of air supplied to the combustion chamber 105 for generating the target torque and the amount of fuel injection. This increases the amount of heat generated by combustion of the mixture and thus warms up the catalyst device 13 earlier. In the catalyst warm-up mode M2, the fuel is injected at a predetermined timing that is previously stored in the memory and that is not changed in accordance with the engine RPM (engine speed) or the amount of intake air.

By injecting the fuel by two-injection intake in the catalyst warm-up mode M2, the mixture is homogenized, resulting in an increase in the combustion efficiency and suppression of emission deterioration. As long as emission deterioration is suppressed, the catalyst warm-up mode M2 is not limited to two-injection intake and may be a different injection mode, such as one in which the fuel is injected once in the intake stroke (one-injection intake) or one in which the fuel is injected multiple times in the intake stroke and compression stroke (multiple-injection intake-compression). When the catalyst warm-up mode M2 is complete, the injection mode is switched to the adherence reduction mode M3 or high in-cylinder temperature mode M7 (e.g., homogeneity improvement mode M4).

The adherence reduction mode M3 is performed in order to reduce soot when the piston temperature is low. In the adherence reduction mode M3, the fuel is injected in an area other than a predetermined injection-prohibited area near the intake top dead center (TDC) at the start of the intake stroke and a predetermined injection-prohibited area near the compression top dead center (TDC) at the end of the compression stroke, that is, in an area in which the piston crown surface 103a is away from the injector 12 (injectable areas). For example, the injection-prohibited area is set in a part or almost all of the first half of the intake stroke and a part or almost all of the second half of the compression stroke.

More specifically, the injection-prohibited area is set in accordance with the engine speed. As the engine speed becomes higher, the piston crown surface 103a retreats from the injector 12 in the intake stroke at a higher speed and approaches the injector 12 in the compression stroke at a higher speed. For this reason, as the engine speed becomes higher, the injection-prohibited area in the intake stroke becomes narrower (the end of the injection-prohibited area is shifted to the advance side), and the injection-prohibited area in the compression stroke becomes wider (the start of the injection-prohibited area is shifted to the retard side).

Figure 5:
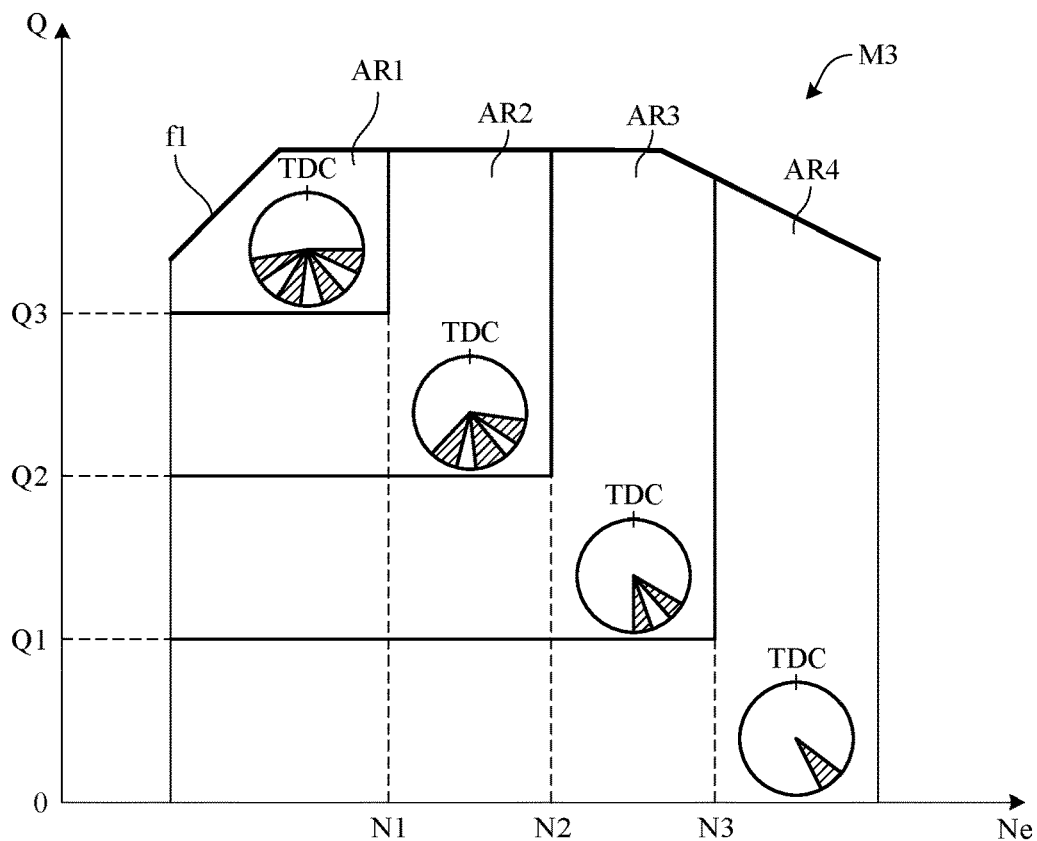
FIG. 5 is a diagram showing an example of an injection map corresponding to an adherence reduction mode of FIG. 4.

The fuel injection frequency and fuel injection timing in the injectable area are determined on the basis of a map previously stored in the memory, for example, a map shown in FIG. 5. Specifically, as shown in FIG. 5, the injection frequency and injection timing are determined on the basis of a predetermined map so as to be associated with a characteristic f1 of the maximum output torque corresponding to the engine speed Ne and the target amount of injection Q, as shown in FIG. 5, and the injection frequency is set to one to four times. If the injection frequency is multiple times, the same amount of fuel is injected each time. The target amount of injection Q is calculated as a value such that the actual air-fuel ratio becomes the target air-fuel ratio and is determined in accordance with the amount of intake air. For this reason, the map of FIG. 5 may be rewritten as a map of the engine speed Ne and the amount of intake air G, like the map of the homogeneity improvement mode M4 of FIG. 4.

To suppress adherence of the fuel to the piston crown surface 103a, it is preferred to reduce the amount of one injection by increasing the injection frequency. However, the minimum amount of one injection Qmin of the injector 12 is defined by the specification of the injector 12, and the injector 12 cannot inject the fuel in a smaller amount than the minimum amount of injection Qmin (MinQ constraint). Accordingly, the injection frequency is once in an area in which the target amount of injection is small, and is gradually increased to twice, three times, and four times as the target amount of injection Q is increased.

On the other hand, to increase the injection frequency, the injector 12 has to be driven at a higher speed. For this reason, for example, a capacitor in an injector driving electrical circuit of the controller 30 has to be repeatedly charged and discharged within a short time. In this case, the injector 12 has to be driven at a higher speed as the engine speed Ne becomes higher. Thus, the controller 30 bears a higher electrical load and generates a greater amount of heat. The injection frequency is limited due to this heat constraint of the controller 30 (ECU heat constraint). That is, while the injection frequency is four times in an area in which the engine speed Ne is low, the injection frequency is gradually limited to three times, twice, and once as the engine speed Ne is increased.

In view of the foregoing, for example, the injection frequency is set to four times (four-stage injection) in an area AR1 in which the engine speed Ne is smaller than a predetermined value N1 and the target amount of injection Q is equal to or greater than a predetermined value Q3; the injection frequency is set to three times (three-stage injection) in an area AR2 in which the engine speed Ne is smaller than a predetermined value N2 and the target amount of injection Q is equal to or greater than a predetermined value Q2, except for the area AR1; the injection frequency is set to twice (two-stage injection) in an area AR3 in which the engine speed Ne is smaller than a predetermined value N3 and the target amount of injection Q is equal to or greater than a predetermined value Q1, except for the areas AR1 and AR2; and the injection frequency is set to once (single injection) in an area AR4 in which the engine speed Ne is equal to or greater than the predetermined value N3 or the target amount of injection Q is smaller than the predetermined value Q1.

The predetermined values N1 to N3 have a relationship of N1<N2<N3, and the predetermined values Q1 to Q3 have a relationship of Q1<Q2<Q3. The predetermined values N1 to N3 and Q1 to Q3 are previously determined through an experiment and stored in the memory. The maximum injection frequency in the adherence reduction mode M3 is determined on the basis of the specification of the injector 12, controller 30, or the like, the mounting position of the injector 12, or the like and may be smaller or greater than four times. When the adherence reduction mode is complete, the injection mode is switched to the high in-cylinder temperature mode M7 (e.g., homogeneity improvement mode M4) or fuel stop mode M6.

The homogeneity improvement mode M4 is an injection mode in which fuel efficiency is optimized. In the homogeneity improvement mode, the fuel is injected by one-injection intake or two-injection intake in accordance with a control map corresponding to the engine speed Ne and the amount of intake air G previously stored in the memory. Specifically, as shown in FIG. 4, the fuel is injected by two-injection intake in a high-load, low-rotation area in which the engine speed Ne is low and the amount of intake air G is large, while the fuel is injected by one-injection intake in an area in which the engine speed Ne is high or the amount of intake air G is small. This control map is changed in accordance with the cooling water temperature. In the case of two-injection intake, the same amount of fuel is injected each time. By injecting the fuel by one-injection intake or two-injection intake in the homogeneity improvement mode, the mixture in the combustion chamber 105 is homogenized by a tumble flow and thus fuel efficiency is increased.

Also, in the homogeneity improvement mode M4, the ignition timing of the ignition plug 11 is controlled mainly in accordance with the engine speed Ne and the amount of intake air G. Specifically, in an area in which knocks do not occur or are less likely to occur, the ignition timing is controlled to the optimum ignition timing, i.e., MBT that is closer to the advance side than the compression top dead center (TDC) and that is previously stored in the memory. On the other hand, in an area in which knocks occur or are more likely to occur, for example, in a high-load, low-rotation area in which the engine speed is low and the amount of intake air is large, the ignition timing is retarded from the MBT in accordance with a characteristic previously stored in the memory in order to suppress knocks. The ignition timing may be retarded by disposing a knock sensor that detects knocks and detecting knocks using the knock sensor. When predetermined knock suppression conditions are satisfied, the homogeneity improvement mode M4 is switched to the knock suppression mode M5.

The knock suppression mode M5 is an injection mode in which knocks are suppressed. In the knock suppression mode M5, the retarded ignition timing is returned (advanced) to the MBT side, and the fuel is injected once in the intake stroke (e.g., in the first half of the intake stroke) and once in the compression stroke (e.g., in the first half of the compression stroke) (multiple-injection intake-compression). In the compression stroke, the amount of injection is the minimum amount of injection Qmin; in the intake stroke, the amount of injection is an amount obtained by subtracting the minimum amount of injection Qmin from the target amount of injection Q. By injecting the fuel in the compression stroke, the temperature of end gas in the combustion chamber 105 is reduced by the latent heat of vaporization.

Thus, knocks are suppressed while the amount of retardation of the ignition timing is suppressed. As a result, fuel efficiency is increased compared to when the ignition timing is retarded and the fuel is injected only in the intake stroke. When the knock suppression node is complete, that is, when the knock suppression conditions become unsatisfied, the injection mode is switched to the homogeneity improvement mode. That is, when the in-cylinder temperature is high (the injection mode is the high in-cylinder temperature mode M7), the injection mode is switched between the homogeneity improvement mode M4 and knock suppression mode M5 in accordance with whether the knock suppression conditions are satisfied.

The fuel stop mode M6 is a mode in which fuel injection is stopped and thus combustion is stopped in the combustion chamber 105. When the travel mode is the EV mode, F/C mode, or I/S mode, the injection mode is switched to the fuel stop mode M6. For example, when combustion is stopped in the adherence reduction mode M3 or high in-cylinder temperature mode M7, the injection mode is switched to the fuel stop mode M6. When the fuel stop mode M6 is complete, the injection mode is switched to one of the start mode M1, adherence reduction mode M3, and high in-cylinder temperature mode M7.

The temperature information acquisition unit 302 of FIG. 3 acquires information on the temperature in the cylinder 102. This temperature information is information on the in-cylinder temperature, which influences adherence of the fuel in the cylinder 102, and corresponds to the temperature of the piston crown surface 103a. For this reason, if a sensor capable of accurately detecting the temperature of the piston crown surface 103a is disposed, the temperature information acquisition unit 302 would only have to acquire information from that sensor. However, the piston crown surface 103a reciprocates in the cylinder 102 so as to face the combustion chamber 105 having a high temperature and therefore it is difficult to directly accurately detect the temperature of the piston crown surface 103a using such a sensor.

On the other hand, the temperature of the piston crown surface 103a has a correlation with the amount of intake air G supplied into the combustion chamber 105 for combustion in the combustion chamber 105. Specifically, when the cumulative amount of the amounts of intake air G is increased, a larger amount of heat is generated in the combustion chamber 105 and thus the temperature of the piston crown surface 103a corresponding to the in-cylinder temperature is increased. For this reason, the temperature information acquisition unit 302 acquires signals from the intake air amount sensor 34 and calculates the cumulative amount of the amounts of intake air G on the basis of the acquired signals.

Figure 6:
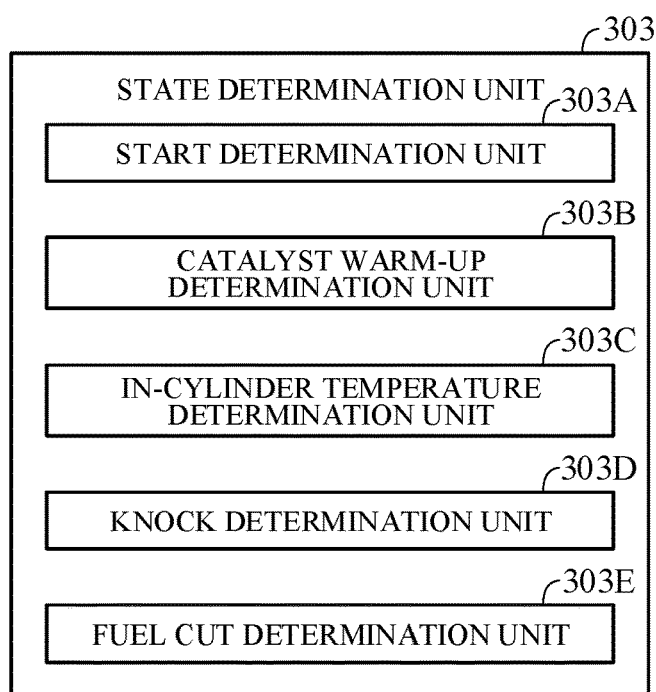
FIG. 6 is a block diagram showing a functional configuration of a state determination unit of FIG. 3.

The state determination unit 303 determines the operation state of the engine 1 related to switching of the injection mode. FIG. 6 is a block diagram showing the functional elements of the state determination unit 303. As shown in FIG. 6, the state determination unit 303 includes a start determination unit 303A, a catalyst warm-up determination unit 303B, an in-cylinder temperature determination unit 303C, a knock determination unit 303D, and a fuel cut determination unit 303E.

In the start mode M1 of FIG. 4, the start determination unit 303A determines whether the start of the engine 1 is complete. Specifically, the start determination unit 303A determines whether the start of the engine 1 is complete, on the basis of whether a predetermined count value has been counted after the rotational speed of the cranked engine calculated on the basis of signals from the crank angle sensor 31 is increased to the complete explosion rotational speed, at which the engine is able to maintain rotation on its own. If the start determination unit 303A determines that the start of the engine 1 is complete, the injection mode switching unit 301 switches the injection mode from the start mode M1 to the catalyst warm-up mode M2, adherence reduction mode M3, or high in-cylinder temperature mode M7 (e.g., homogeneity improvement mode M4).

The start determination unit 303A determines not only whether the start of the engine 1 is complete, but also whether the engine 1 needs to be started. Specifically, in the fuel stop mode M6 of FIG. 4, the start determination unit 303A determines whether the travel mode needs to be switched from the EV mode to the engine mode or hybrid mode and whether the travel mode needs to be restored from the I/S mode. If the start determination unit 303A determines that the travel mode needs to be switched to the engine mode or that the travel mode needs to be restored from the I/S mode, the injection mode switching unit 301 switches the injection mode from the fuel stop mode M6 to the start mode M1.

In the catalyst warm-up mode M2 of FIG. 4, the catalyst warm-up determination unit 303B determines whether warm-up of the catalyst device 13 (catalyst warm-up) is complete. This determination is a determination as to whether the total workload of the engine 1 has reached the target total workload required for catalyst warm-up. The target total workload is set in accordance with the cooling water temperature detected by the water temperature sensor 33 at the start of the engine 1 using a previously stored relational expression, characteristic, or map. For example, when the cooling water temperature is low, it takes time to warm up the catalyst, since the engine 1 has yet to be warmed up. In view of the foregoing, the target total workload is set to a larger value as the cooling water temperature is lower.

The catalyst warm-up determination unit 303B first calculates the total workload of the engine 1 corresponding to the cooling water temperature on the basis of signals from the water temperature sensor 33. Subsequently, when the total workload reaches the target total workload, the catalyst warm-up determination unit 303B determines that the catalyst warm-up is complete. Thus, the injection mode switching unit 301 switches the injection mode from the catalyst warm-up mode M2 to the adherence reduction mode M3 or high in-cylinder temperature mode M7 (e.g., homogeneity improvement mode M4).

Also, in the start mode M1 of FIG. 4, the catalyst warm-up determination unit 303B determines whether catalyst warm-up is needed. For example, when the cooling water temperature is high due to restoration from the EV travel, or the like, the catalyst warm-up determination unit 303B sets the target total workload to 0 and determines that catalyst warm-up is not needed. In this case, the injection mode switching unit 301 switches the injection mode from the start mode M1 to the adherence reduction mode M3 or high in-cylinder temperature mode M7 (e.g., homogeneity improvement mode M4). On the other hand, if, in the start mode M1, the catalyst warm-up determination unit 303B sets the target total workload to a value greater than 0 and determines that catalyst warm-up is needed, the injection mode switching unit 301 switches the injection mode from the start mode M1 to the catalyst warm-up mode M2.

The in-cylinder temperature determination unit 303C determines whether the in-cylinder temperature corresponding to the temperature of the piston crown surface 103a is equal to or greater than a predetermined value (e.g., 100° C.), on the basis of the cumulative amount of the amounts of intake air G acquired by the temperature information acquisition unit 302. That is, the in-cylinder temperature determination unit 303C determines whether the in-cylinder temperature is a high in-cylinder temperature equal to or greater than the predetermined value or a low in-cylinder temperature smaller than the predetermined value. In each of the start mode M1, catalyst warm-up mode M2, and fuel stop mode M6 of FIG. 4, the in-cylinder temperature determination unit 303C determines whether the in-cylinder temperature is a high in-cylinder temperature.

In the homogeneity improvement mode M4 of FIG. 4, the knock determination unit 303D determines whether the knock suppression conditions are satisfied. This determination is a determination as to whether the amount of retardation of the ignition timing for suppressing knocks has become equal to or greater than a predetermined value and is a determination as to whether the injection mode needs to be switched to the mode in which knocks are suppressed. When the engine rotational speed (engine speed) is high and when the cooling water temperature is low, knocks are less likely to occur. From this viewpoint, the knock suppression conditions are as follows: the amount of retardation of the ignition timing from the MBT is equal to or greater than a predetermined value; the cooling water temperature is equal to or greater than a predetermined value; and the engine speed is equal to or smaller than a predetermined value. If the knock determination unit 303D determines that the knock suppression conditions are satisfied, the injection mode switching unit 301 switches the injection mode from the homogeneity improvement mode M4 to the knock suppression mode M5.

If, in the knock suppression mode M5, the knock determination unit 303D determines that the knock suppression conditions are unsatisfied, the injection mode switching unit 301 switches the injection mode from the knock suppression mode M5 to the homogeneity improvement mode M4. The injection mode may be switched from the adherence reduction mode M3 to the knock suppression mode M5 without going through the homogeneity improvement mode M4. Specifically, if, in the adherence reduction mode M3, the in-cylinder temperature determination unit 303C determines that the in-cylinder temperature is high, the injection mode may be switched to the knock suppression mode M5. Thus, when the in-cylinder temperature determination unit 303C determines that a low in-cylinder temperature state has been changed to a high in-cylinder temperature state, the injection mode is quickly switched to the knock suppression mode M5 without going through the homogeneity improvement mode M4, resulting in an increase in the combustion efficiency.

The fuel cut determination unit 303E determines whether fuel cut is needed in each of the catalyst warm-up mode M2, adherence reduction mode M3, and high in-cylinder temperature mode M7 of FIG. 4. In other words, the fuel cut determination unit 303E determines whether the travel mode needs to be switched to the EV mode, F/C mode, or I/S mode. If the fuel cut determination unit 303E determines that fuel cut is needed, the injection mode switching unit 301 switches the injection mode from the catalyst warm-up mode M2, adherence reduction mode M3, or high in-cylinder temperature mode M7 to the fuel stop mode M6.

The ignition control unit 304 of FIG. 3 outputs control signals to the ignition plug 11 so that the ignition timing becomes the target ignition timing according to a map or characteristic corresponding to the operation state previously stored in the memory. For example, in the catalyst warm-up mode M2, the ignition control unit 304 outputs control signals to the ignition plug 11 so that the ignition timing is retarded from the MBT. In the homogeneity improvement mode M4, the ignition control unit 304 outputs control signals to the ignition plug 11 so that the ignition timing becomes the MBT or is retarded to suppress knocks. In the knock suppression mode M5, the ignition control unit 304 outputs control signals to the ignition plug 11 so that the retarded ignition timing is returned (advanced) to the MBT side.

The injector control unit 305 calculates the target amount of injection per cycle in accordance with the amount of intake air detected by the intake air amount sensor 34 while performing feedback control so that the actual air-fuel ratio detected by the AF sensor 35 becomes the target air-fuel ratio (e.g., a theoretical air-fuel ratio). The injector control unit 305 then calculates the target amount of one injection (the unit target amount of injection) corresponding to the injection mode of FIG. 4 and outputs control signals to the injector 12 so that the injector 12 injects the fuel in the unit target amount at a predetermined timing.

Figure 7:
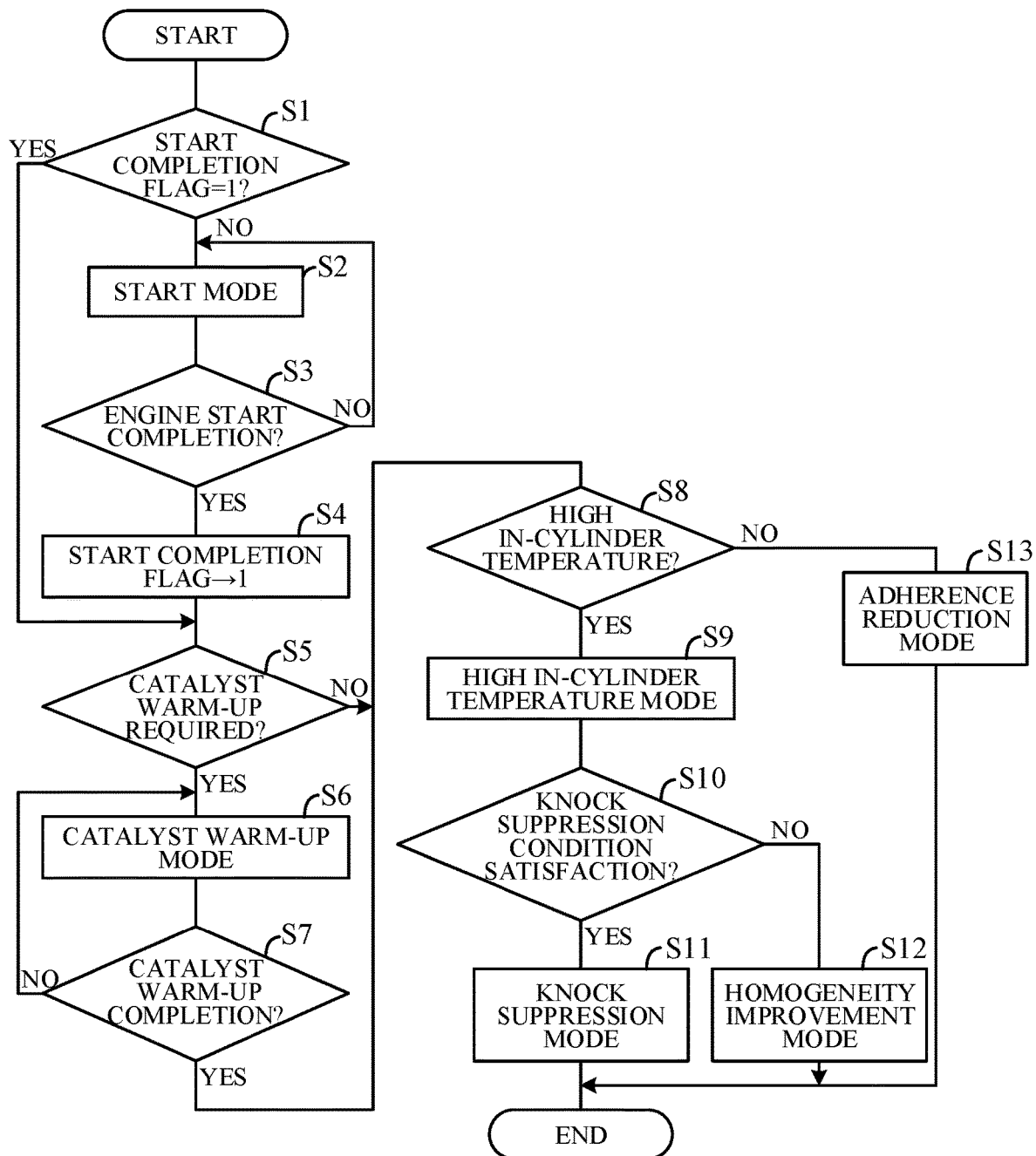
FIG. 7 is a flowchart showing an example of a process performed by a controller in FIG. 3.

FIG. 7 is a flowchart showing an example of a process performed by the controller 30 in accordance with a program previously stored in the memory and, more specifically, an example of a process related to switching of the injection mode. For example, the process shown in this flowchart is started when a command to start the engine 1 is issued in response to turn-on of the ignition switch, and repeated in a predetermined cycle. FIG. 7 does not show a process related to switching from the fuel stop mode M6 of FIG. 4 to any other injection mode or a process related to switching from any other injection mode to the fuel stop mode M6.

As shown in FIG. 7, first, in S1 (S: a process step), the controller 30 determines whether a start completion flag is 1. The start completion flag is 0 at the initial time and is set to 1 when the start of the engine 1 is complete in the start mode M1. If the determination in S1 is NO, the process proceeds to S2; if the determination in S1 is YES, the process skips S2 to S4 and proceeds to S5. In S2, the injection mode is switched to the start mode.

Then, in S3, the controller 30 determines whether the start of the engine 1 is complete, that is, whether the engine speed has reached the complete explosion speed, on the basis of signals from the crank angle sensor 31. If the determination in S3 is YES, the process proceeds to S4; if the determination in S3 is NO, the process returns to S2. In S4, the controller 30 sets the start completion flag to 1.

Then, in S5, the controller 30 determines whether warm-up of the catalyst device 13 is needed, on the basis of whether the target total workload set on the basis of signals from the water temperature sensor 33 is 0. If the determination in S5 is YES, the process proceeds to S6; if the determination in S5 is NO, the process skips S6 and S7 and proceeds to S8. In S6, the controller 30 switches the injection mode to the catalyst warm-up mode M2. In S7, the controller 30 calculates the total workload of the engine 1 on the basis of signals from the intake air amount sensor 34, as well as determines whether catalyst warm-up is complete, on the basis of whether the total workload has reached the target total workload. If the determination in S7 is YES, the process proceeds to S8; if the determination in S7 is NO, the process returns to S6.

In S8, the controller 30 determines whether the in-cylinder temperature is equal to or greater than the predetermined value, that is, whether it is a high in-cylinder temperature, on the basis of the cumulative amount of the amounts of intake air G acquired from the temperature information acquisition unit 302. If the determination in S8 is YES, the process proceeds to S9 and the controller 30 switches the injection mode to the high in-cylinder temperature mode M7.

Then, in S10, the controller 30 determines whether the knock suppression conditions are satisfied, on the basis of the amount of retardation of the ignition timing from the MBT, the cooling water temperature detected by the water temperature sensor 33, and the engine speed detected by the crank angle sensor 31. If the determination in S10 is YES, the process proceeds to S11; if the determination in S10 is NO, the process proceeds to S12. In S11, the injection mode is switched to the knock suppression mode M5; in S12, the injection mode is switched to the homogeneity improvement mode M4. On the other hand, if the determination in S8 is NO, the process proceeds to S13 and the injection mode is switched to the adherence reduction mode M3.

The main operation of the control apparatus according to the present embodiment will be described more specifically. When the ignition switch is turned on, the fuel is injected by two-injection compression and the engine 1 is started (S2). If the cooling water temperature is low due to the first start of the engine 1, or the like, warm-up of the catalyst device 13 is needed and the fuel is injected by two-injection intake (S6). Thus, the ignition timing is retarded from the MBT so that the mixture is burnt later, allowing the catalyst device 13 to be warmed up earlier.

After the warm-up of the catalyst device 13 is complete (e.g., immediately after completion of the warm-up following the first start of the engine 1), the in-cylinder temperature may have yet to be increased to a predetermined temperature (e.g., 100° C.) required to reduce adherence of soot to the piston crown surface 103a. In this case, the fuel is injected in accordance with the map of FIG. 5 in a range from the second half of the intake stroke to the first half of compression stroke so that a reduction in adherence of soot is preferentially performed (S13). Thus, for example, the fuel is injected four times in a high-load, low-rotation area AR1. As a result, the amount of one fuel injection of the injector 12 is reduced and thus adherence of the fuel is effectively suppressed.

On the other hand, if the in-cylinder temperature after completion of the warm-up of the catalyst device 13 is equal to or greater than a predetermined temperature, soot is less likely to occur. This is because even if the fuel adheres to the piston crown surface 103a, the fuel instantly evaporates. In this case, the fuel is injected in the intake stroke (by two-injection intake or one-injection intake) (S12). Thus, the mixture in the combustion chamber 105 is homogenized, resulting in an increase in the combustion efficiency. The fuel is injected by two-injection intake also during catalyst warm-up. However, the above fuel injection in the intake stroke (at high in-cylinder temperature state) is performed at a timing different from that during catalyst warm-up.

If the knock suppression conditions are satisfied when the fuel is being injected in the intake stroke in a high in-cylinder temperature state, the fuel is injected in the intake stroke and the fuel of the minimum amount Qmin is also injected in the compression stroke (S11). Thus, the temperature of the mixture is reduced, resulting in suppression of knocks. As a result, the amount of retardation of the ignition timing for suppressing knocks is reduced, and the ignition timing approaches the MBT. Thus, the combustion efficiency is increased.

When the engine 1 is started due to restoration from the EV mode or I/S mode, or the like, the cooling water temperature may be sufficiently high. In this case, the injection mode is switched to the high in-cylinder temperature mode M7 (e.g., homogeneity improvement mode M4) or adherence reduction mode M3 (S5→S8→S9, S5→S8→S13) without warming up the catalyst device 13 after the start of the engine. Thus, efficient combustion is performed after the start of the engine while adherence of soot to the piston crown surface 103a is suppressed.

The present embodiment can achieve advantages and effects such as the following:

(1) The internal combustion engine control apparatus according to the present embodiment is configured to control the engine 1 including the piston 103 that reciprocates in the cylinder 102 and the injector 12 that injects the fuel into the combustion chamber 105 facing the piston 103 in the cylinder 102 (FIG. 2). This control apparatus includes the catalyst warm-up determination unit 303B determines whether warm-up of the catalyst device 13 disposed on the exhaust passage 114 of the engine 1 is complete; the temperature information acquisition unit 302 that acquires information on the temperature in the cylinder 102; the injection mode switching unit 301 that, when the catalyst warm-up determination unit 303B determines that the catalyst warm-up is complete, switches the injection mode to one of the adherence reduction mode M3, in which the fuel is injected one to four times mainly in a range from the second half of intake to the first half of compression, and the homogeneity improvement mode M4, in which the fuel is injected by one-injection intake or two-injection intake, in accordance with the temperature information acquired by the temperature information acquisition unit 302; and the injector control unit 305 that controls the injector 12 so that the injector 12 injects the fuel in accordance with the injection mode switched by the injection mode switching unit 301 (FIGS. 3, 6). As seen above, after the completion of warm-up of the catalyst device 13, the injection mode is switchable not only to the homogeneity improvement mode M4 but also to the adherence reduction mode M3. Thus, when the piston temperature is low, that is, when the in-cylinder temperature is low, adherence of soot to the piston crown surface 103a is favorably suppressed.

(2) The internal combustion engine control apparatus further includes the in-cylinder temperature determination unit 303C that determines whether warm-up in the cylinder 102 is complete, that is, whether the temperature in the cylinder 102 is a low in-cylinder temperature or high in-cylinder temperature, on the basis of the temperature information acquired by the temperature information acquisition unit 302 (FIG. 6). If the in-cylinder temperature determination unit 303C determines that the in-cylinder temperature is low, that is, determines that the warm-up in the cylinder 102 is not complete, the injection mode switching unit 301 switches the injection mode to the adherence reduction mode M3; if it determines that that the in-cylinder temperature is high, that is, that the warm-up in the cylinder 102 is complete, the injection mode switching unit 301 switches the injection mode to the homogeneity improvement mode M4 (FIG. 7). Thus, adherence of the fuel is efficiently suppressed. The in-cylinder temperature may be low after completion of the warm-up of the catalyst device 13. If the injection mode is switched to the homogeneity improvement mode M4 in that state, soot may adhere to the piston crown surface 103a. For this reason, the injection mode is switched to the adherence reduction mode M3 and thus soot is suppressed.

(3) The internal combustion engine control apparatus further includes the crank angle sensor 31 that detects the speed of the engine 1 and the intake air amount sensor 34 that detects the amount of intake air as a physical quantity having a correlation with the output torque of the engine 1 (FIG. 3). The adherence reduction mode M3 is a mode in which the fuel is injected once or multiple times (up to four times) in a predetermined operation stroke extending over the intake stroke and compression stroke in accordance with the engine speed Ne detected by the crank angle sensor 31 and the amount of intake air detected by the intake air amount sensor 34 (to be more precise, the target amount of injection Q corresponding to the amount of intake air) (FIG. 5). The homogeneity improvement mode M4 is a mode in which the fuel is injected once or multiple times (twice) in the intake stroke in accordance with the engine speed Ne detected by the crank angle sensor 31 and the amount of intake air G detected by the intake air amount sensor 34 (FIG. 4). The maximum fuel injection frequency (four times) in the adherence reduction mode M3 is greater than the maximum fuel injection frequency (twice) in the homogeneity improvement mode M4. Thus, the amount of one injection of the injector 12 in the adherence reduction mode M3 is reduced compared to the amount of one injection of the injector 12 in the homogeneity improvement mode M4, resulting in favorable suppression of adherence of the fuel.

(4) The internal combustion engine control apparatus further includes the knock determination unit 303D that determines whether the knock suppression conditions, such as whether the amount of retardation of the ignition timing for suppressing knocks in the engine 1 has become equal to or greater than the predetermined value, are satisfied (FIG. 6). If the injection mode is the adherence reduction mode M3 or homogeneity improvement mode M4 and if the knock determination unit 303D determines that the injection mode needs to be switched to the mode in which knocks are suppressed, the injection mode switching unit 301 switches the injection mode to the knock suppression mode M5, in which the fuel is injected by multiple-injection intake-compression (FIG. 7). Thus, knocks are effectively suppressed while the amount of retardation of the ignition timing is suppressed.

The configuration related to switching between the homogeneity improvement mode M4 and knock suppression mode M5 of FIG. 4, of the internal combustion engine control apparatus thus configured will be described in more detail. When the knock suppression conditions are satisfied in the homogeneity improvement mode M4, the injection mode is switched to the knock suppression mode M5. The knock suppression conditions includes a condition that the amount of retardation of the ignition timing from the MBT, at which the output torque is maximized, becomes the predetermined value (the predetermined amount of switching retardation). This will be described first. The amount of retardation is the degree to which knocks are suppressed, that is, a parameter representing the degree of knock suppression and can be substituted by the degree of knock suppression.

Figure 8:
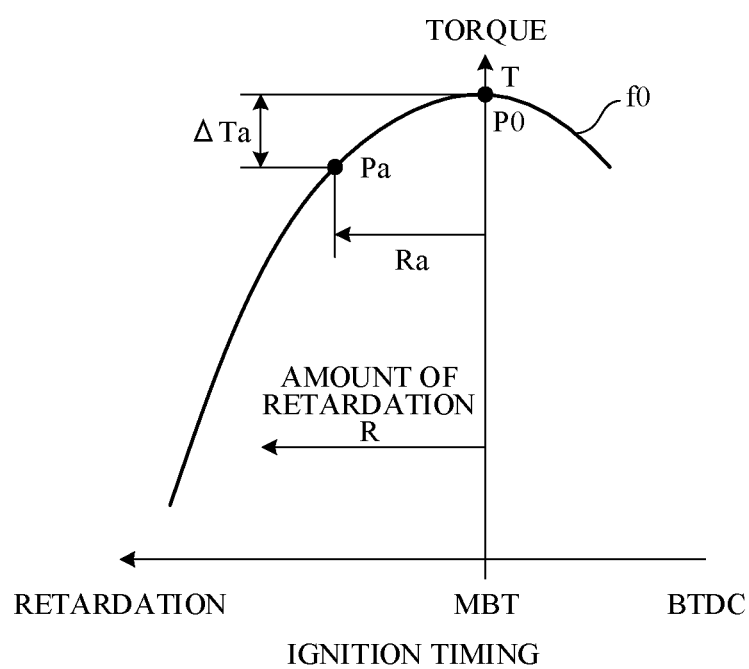
FIG. 8 is a diagram showing a relationship between a retardation of an ignition timing and an output torque.

FIG. 8 is a diagram showing changes in the output torque when the ignition timing is retarded from the normal ignition timing with the amount of intake air being constant. The lateral axis represents the ignition timing (angle), and the longitudinal axis represents the output torque. The normal ignition timing is the ignition timing in an operation state in which knocks do not occur. In FIG. 8, the normal ignition timing is the MBT before compression top dead center, i.e., before TDC (BTDC) in the compression stroke. As shown in FIG. 8, the output torque T is maximized when the ignition timing is the MBT (point P0). As the ignition timing is retarded and the amount of retardation R is increased, the output torque T is reduced along an approximately parabolic characteristic f0 having point P0 as a vertex. As an example, at point Pa, where the amount of retardation R from the MBT is Ra (e.g., 5°), the output torque T is lower by ΔTa. Ra corresponds to the amount of switching retardation (to be discussed later).

The ignition control unit 304 of FIG. 3 includes a retardation calculation unit that calculates the amount of retardation (the target amount of retardation) R from the MBT corresponding to the target ignition timing. For example, the target amount of retardation is calculated in accordance with the engine speed detected by the crank angle sensor 31 and the amount of intake air detected by the intake air amount sensor 34. Specifically, the relationship of the target amount of retardation with respect to the engine speed and the amount of intake air is previously stored in the memory, and this relationship is, for example, a relationship in which the target amount of retardation is increased as the engine speed is reduced and the amount of intake air is increased. The ignition control unit 304 calculates the target amount of retardation for suppressing knocks, using this relationship and controls the ignition plug 11 so that the ignition timing is retarded from the MBT by the target amount of retardation. Retardation of the ignition timing is performed in both of the homogeneity improvement mode M4 and knock suppression mode M5 of FIG. 4, which represent high in-cylinder temperature states.

Figure 9A:
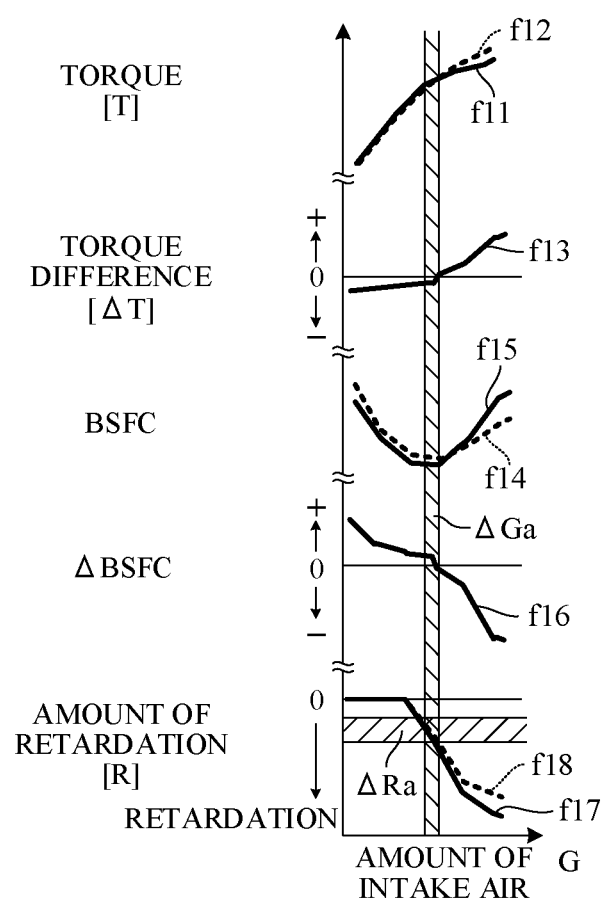
FIG. 9A is an diagram showing an example of a characteristic in a first operation state in the internal combustion engine control apparatus according to the embodiment of the invention.

FIG. 9A shows characteristics f11 and f12 of the output torque T1 in the homogeneity improvement mode M4 and the output torque T2 in the knock suppression mode M5, a characteristic f13 representing the difference between the output torques T1 and T2, that is, the torque difference ΔT (=T2−T1), characteristics f14 and f15 of the brake-specific fuel consumption BSFC1 of the output torque T1 and the brake-specific fuel consumption BSFC2 in the knock suppression mode M5, a characteristics f16 representing the difference between the brake-specific fuel consumption BSFC1 and BSFC2, that is, ΔBSFC (=BSFC2−BSFC1), and characteristics f17 and f18 of the amount of retardation R1 in the homogeneity improvement mode M4 and the amount of retardation R2 in the knock suppression mode M5 corresponding to changes in the amount of intake air G. The amount of retardation R is the amount of retardation from the MBT of 0.

FIG. 9A is a diagram showing an example of a characteristic of a predetermined operation state (first operation state) of the engine 1. The first operation state is an operation state in which the engine speed is a first speed (e.g., 2000 rpm), a fuel whose octane rating is a first predetermined value (e.g., 91) is used, and exhaust gas is recirculated by the internal EGR (Exhaust Gas Recirculation). In FIG. 9A, the characteristics f11, f15, and f17 corresponding to the homogeneity improvement mode M4 are shown by solid lines, and the characteristics f12, f14, and f18d corresponding to the knock suppression mode M5 are shown by dotted lines.

As shown in FIG. 9A, the output torque T is increased as the amount of intake air G is increased, while the output torque T1 (solid line) in the homogeneity improvement mode M4 is greater than the output torque T2 in the knock suppression mode M5 (dotted line) in a low-load area, in which the amount of intake air G is small (characteristics f11, f12). As the amount of intake air G is increased, the output torque T2 in the knock suppression mode M5 becomes greater than the output torque T4 in the homogeneity improvement mode M4. Specifically, the torque difference ΔT that is negative becomes positive after crossing a predetermined hatched area ΔGa of the amount of intake air serving as a boundary (characteristic f13).

Also, in an area in which the amount of intake air G is smaller than that in the predetermined area ΔGa, the brake-specific fuel consumption BSFC1 (solid line) in the homogeneity improvement mode M4 is lower than the brake-specific fuel consumption BSFC2 (dotted line) in the knock suppression mode M5; in an area in which the amount of intake air G is greater than that in the predetermined area ΔGa, the brake-specific fuel consumption BSFC2 in the knock suppression mode M5 is smaller than the brake-specific fuel consumption BSFC1 in the homogeneity improvement mode M4 (characteristics f14, f15). Specifically, ΔBSFC that is positive becomes negative after crossing the predetermined area ΔGa serving as a boundary (characteristic f16). In this case, the target amount of retardation R1 (characteristic f17) in the homogeneity improvement mode M4 in the predetermined area ΔGa falls within a predetermined hatched area ΔRa (e.g., around −5°).

Figure 9B:
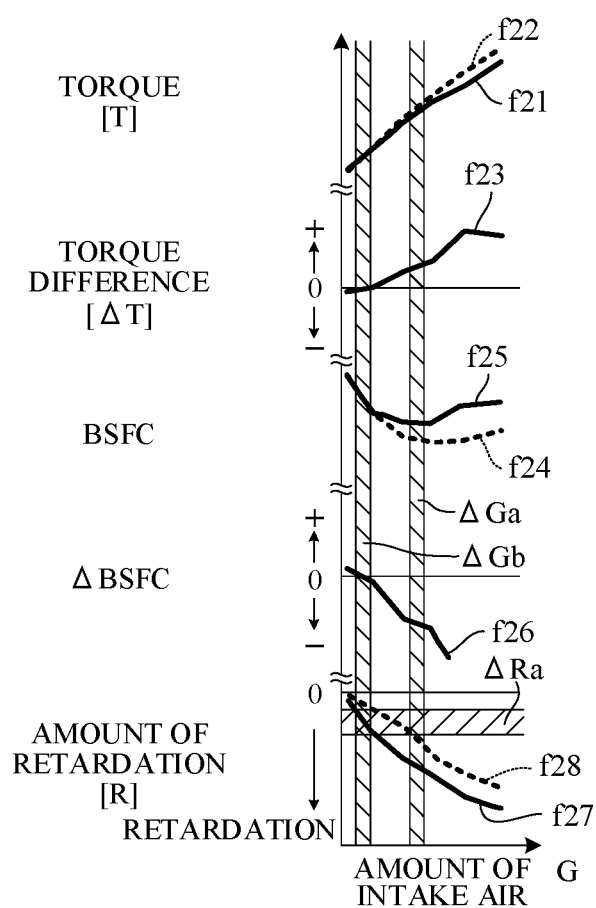
FIG. 9B is an diagram showing an example of a characteristic in a second operation state in the internal combustion engine control apparatus according to the embodiment of the invention.
Figure 9C:
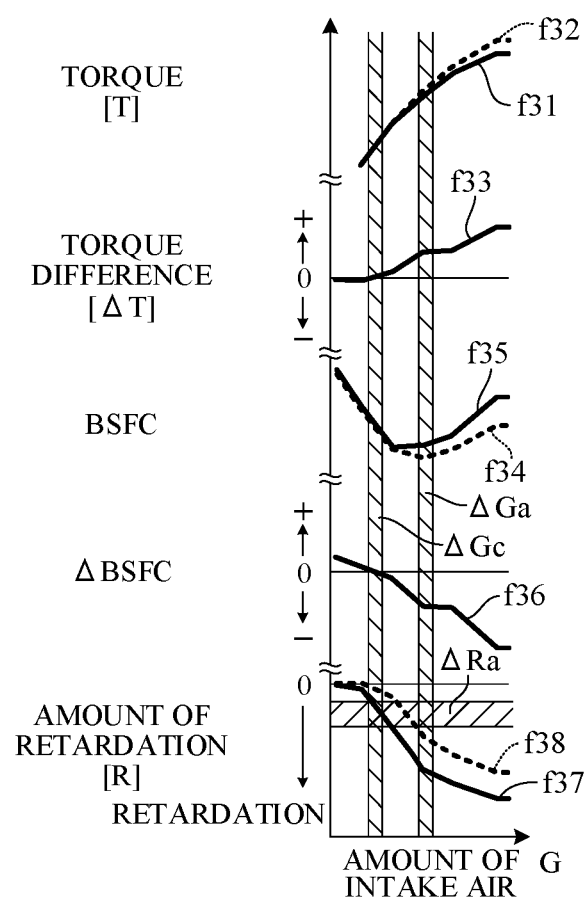
FIG. 9C is an diagram showing an example of a characteristic in a third operation state in the internal combustion engine control apparatus according to the embodiment of the invention.
Figure 9D:
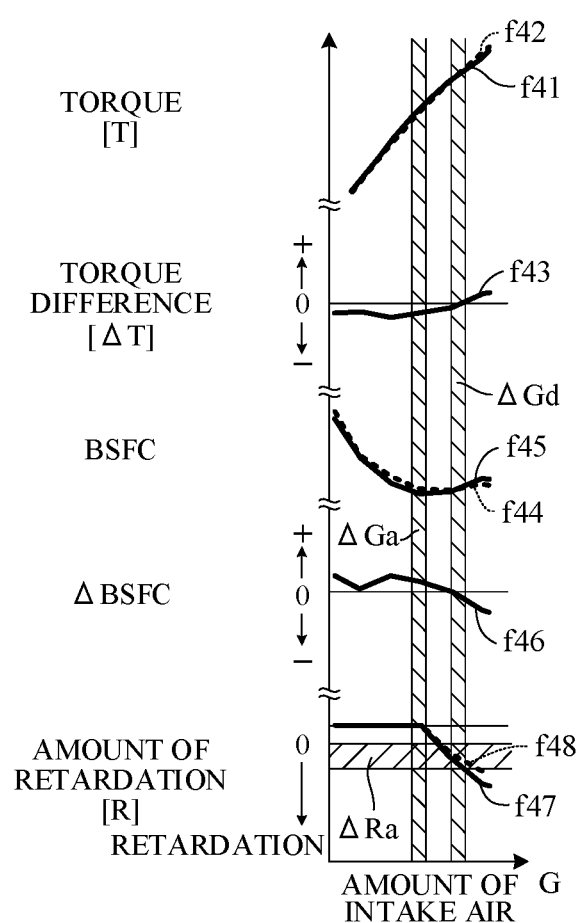
FIG. 9D is an diagram showing an example of a characteristic in a fourth operation state in the internal combustion engine control apparatus according to the embodiment of the invention.
Figure 10A:
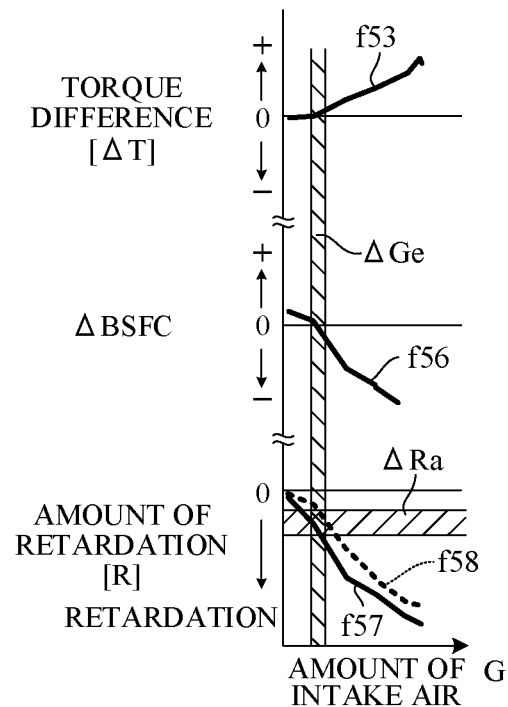
FIG. 10A is an diagram showing an example of a characteristic in a fifth operation state in the internal combustion engine control apparatus according to the embodiment of the invention.
Figure 10B:
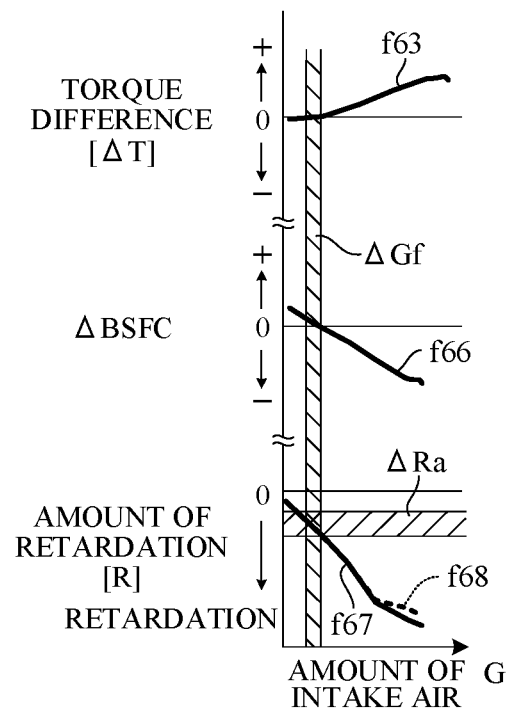
FIG. 10B is an diagram showing an example of a characteristic in a sixth operation state in the internal combustion engine control apparatus according to the embodiment of the invention.
Figure 10C:
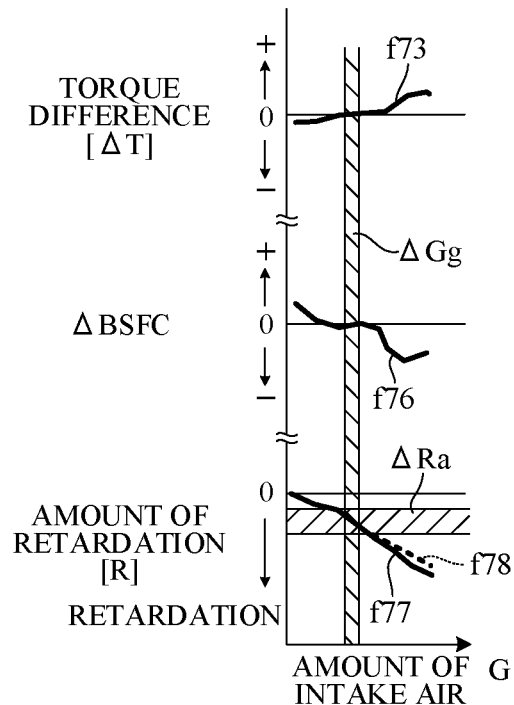
FIG. 10C is an diagram showing an example of a characteristic in a seventh operation state in the internal combustion engine control apparatus according to the embodiment of the invention.
Figure 10D:
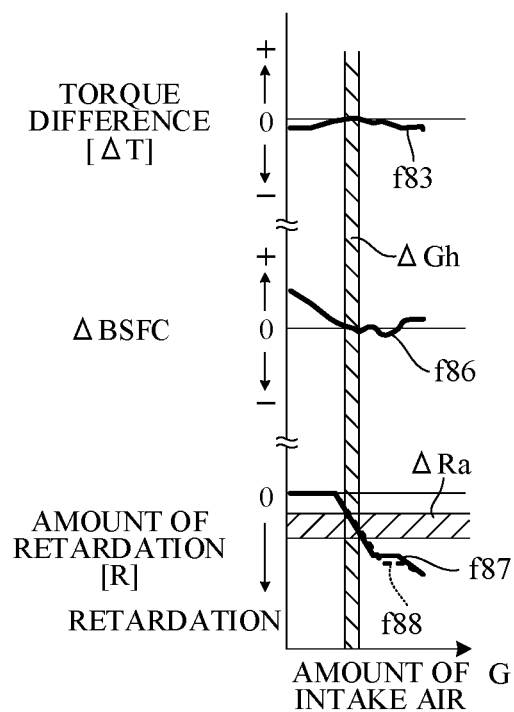
FIG. 10D is an diagram showing an example of a characteristic in a eighth operation state in the internal combustion engine control apparatus according to the embodiment of the invention.

FIGS. 9B, 9C, and 9D are diagrams showing examples of characteristics of operation states different from the first operation state, that is, a second operation state, a third operation state, and a fourth operation state. As with FIG. 9A, these diagrams show the output torque T of the engine 1, the torque difference ΔT, the brake-specific fuel consumption BSFC, ΔBSFC, and the amount of retardation R. FIGS. 9B, 9C, and 9D show characteristics corresponding to the characteristics f11 to f18 of FIG. 9A as characteristics f21 to f28, characteristics f31 to f38, and characteristics f41 to f48, respectively.

The second operation state is an operation state in which the engine speed is the first speed (e.g., 2000 rpm), a fuel whose octane rating is the first predetermined value (e.g., 91) is used, and exhaust gas is not recirculated by the internal EGR or external EGR. The third operation state is an operation state in which the engine speed is the first speed (e.g., 2000 rpm), a fuel whose octane rating is the first predetermined value (e.g., 91) is used, and exhaust gas is recirculated by the external EGR. The fourth operation state is an operation state in which the engine speed is the first speed (e.g., 2000 rpm), a fuel whose octane rating is a second predetermined value (e.g., 95) is used, and exhaust gas is recirculated by the internal EGR.

In FIGS. 9B, 9C, and 9D, areas in which the relative magnitudes of the output torque T1 (solid line) in the homogeneity improvement mode M4 and the output torque T2 (dotted line) in the knock suppression mode M5 are reversed, in other words, areas ΔGb, ΔGc, and ΔGd of the amount of intake air in which the torque difference ΔT is around 0 and ΔBSFC is around 0 are hatched. FIGS. 9B, 9C, and 9D also show the hatched area ΔGa of FIG. 9A. As shown in FIGS. 9A to 9D, the torque difference ΔT that is negative becomes positive as the amount of intake air G is increased (characteristics f13, f23, f33, f43), and ΔBSFC that is positive becomes negative (characteristics f16, f26, f36, f46). Accordingly, by obtaining these areas (referred to as the switching areas) ΔGa, ΔGb, ΔGc, and ΔGd corresponding to the operation states and switching the injection mode from the homogeneity improvement mode M4 to the knock suppression mode M5 in the switching areas ΔGa, ΔGb, ΔGc, and ΔGd, the combustion efficiency is increased.

However, the switching areas ΔGa, ΔGb, ΔGc, and ΔGd vary with the presence or absence or type of the EGR, the octane rating of the fuel, or the like. Although not shown, the switching areas ΔGa, ΔGb, ΔGc, and ΔGd also vary with the engine speed, cooling water temperature, or the like. For this reason, to obtain the switching areas ΔGa, ΔGb, ΔGc, and ΔGd, it is necessary to previously prepare, for each type of engine 1, a multi-dimensional map in which the correlations among various factors that influence the output torque T, BSFC, or the like, such as the amount of intake air, the engine speed, the cooling water temperature, the presence or absence or type of an EGR, and the octane rating of the fuel, are previously defined. That is, it is not easy to obtain the switching areas ΔGa, ΔGb, ΔGc, and ΔGd.

On the other hand, as shown in FIGS. 9A to 9D, the amounts of retardation (solid lines) in the homogeneity improvement mode M4 of the switching areas ΔGa, ΔGb, ΔGc, and ΔGd are all included in the predetermined hatched area ΔRa (e.g., an area around point Pa of FIG. 8). Accordingly, by determining whether the amount of retardation R is included in the predetermined area ΔRa, the switching areas ΔGa, ΔGb, ΔGc, and ΔGd can be obtained and thus the injection mode can be switched from the homogeneity improvement mode M4 to the knock suppression mode M5 at a favorable timing.

FIGS. 10A to 10D are diagrams showing examples of characteristics of operation states different from the first to fourth operation states, that is, a fifth operation state, a sixth operation state, a seventh operation state, and an eighth operation state. FIGS. 10A to 10D show characteristics f53, f63, f73, and f83 of the torque difference ΔT of the engine 1, characteristics f56, f66, f76, and f86 of ΔBSFC, and characteristics f57 and f58, f67 and f68, f77 and f78, f87 and f88 of the amount of retardation R.

For example, the fifth operation state is an operation state in which the engine speed is a second speed (e.g., 1200 rpm), a fuel whose octane rating is the first predetermined value (e.g., 91) is used, and exhaust gas is not recirculated by the internal EGR or external EGR; the sixth operation state is an operation state in which the engine speed is the second speed (e.g., 1200 rpm), a fuel whose octane rating is the first predetermined value (e.g., 91) is used, and exhaust gas is recirculated by the internal EGR; the seventh operation state is an operation state in which the engine speed is a third speed (e.g., 3000 rpm), a fuel whose octane rating is the first predetermined value (e.g., 91) is used, and exhaust gas is not recirculated by the internal EGR or external EGR; and the eighth operation state is an operation state in which the engine speed is the third speed (e.g., 3000 rpm), a fuel whose octane rating is the first predetermined value (e.g., 91) is used, and exhaust gas is recirculated by the internal EGR.

In FIGS. 10A to 10D, areas (switching areas) ΔGe, ΔGf, ΔGg, and ΔGh of the amount of intake air G in which the torque difference ΔT that is negative becomes positive and ΔBSFC that is positive becomes negative are hatched. As shown in FIGS. 10A to 10D, the switching areas ΔGe, ΔGf, ΔGg, and ΔGh of the amount of intake air ΔG differ from each other. On the other hand, the amounts of retardation (solid lines) R in the homogeneity improvement mode M4 of the switching areas ΔGa, ΔGb, ΔGc, and ΔGd are all included the predetermined hatched area ΔRa. Accordingly, in these cases also, by determining whether the amount of retardation R is included in the predetermined area ΔRa, the injection mode can be switched from the homogeneity improvement mode M4 to the knock suppression mode M5 at a favorable timing.

In view of the foregoing, in the present embodiment, the amount of switching retardation Ra for switching the injection mode from the homogeneity improvement mode M4 to the knock suppression mode M5 is previously set in the predetermined area ΔRa and stored in the memory. When the amount of retardation R of the ignition timing controlled by the ignition control unit 304 of FIG. 3 reaches the amount of switching retardation Ra, the injector control unit 305 switches the injection mode from the homogeneity improvement mode M4 to the knock suppression mode M5. When switching the injection mode, not only the amount of retardation R of the ignition timing but also the cooling water temperature and the engine speed are considered.

Figure 11:
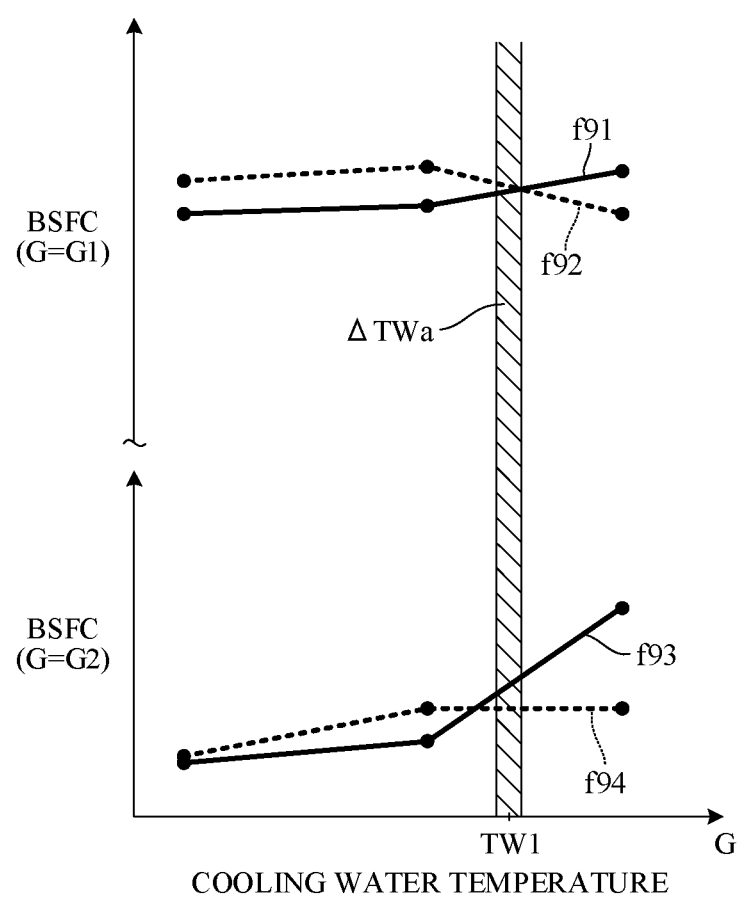
FIG. 11 is a diagram showing an example of an operation of the internal combustion engine control apparatus according to the embodiment of the invention and a relationship between an engine cooling water temperature and a brake-specific fuel consumption.

FIG. 11 is a diagram showing the relationship between the engine cooling water temperature TW and the brake-specific fuel consumption BSFC. In FIG. 11, characteristics f91 and f92 are characteristics of BSFC in the homogeneity improvement mode M4 and the knock suppression mode M5, respectively, under a predetermined amount of intake air G1; the characteristics f93 and f94 are characteristics of BSFC in the homogeneity improvement mode M4 and the knock suppression mode M5, respectively, under a predetermined amount of intake air G2 that is greater than the amount of intake air G2 (>G1).

As shown in FIG. 11, in an area in which the cooling water temperature TW is low, BSFC (solid line) in the homogeneity improvement mode M4 is lower than BSFC in the knock suppression mode M5, whether the amount of intake air is G1 or G2. On the other hand, in a range in which the cooling water temperature TW is equal to or greater than that in a predetermined hatched range ΔTWa (e.g., around 60° C.), BSFC in the knock suppression mode M5 (solid line) is lower than BSFC in the homogeneity improvement mode M4 (solid line), whether the amount of intake air is G1 or G2. In view of the foregoing, in the present embodiment, a condition that the cooling water temperature TW is equal to or greater than a predetermined value TW1 (e.g., 60° C.) is included in the knock suppression conditions. The predetermined value TW1 is previously obtained through an experiment or the like and stored in the memory.

Figure 12:
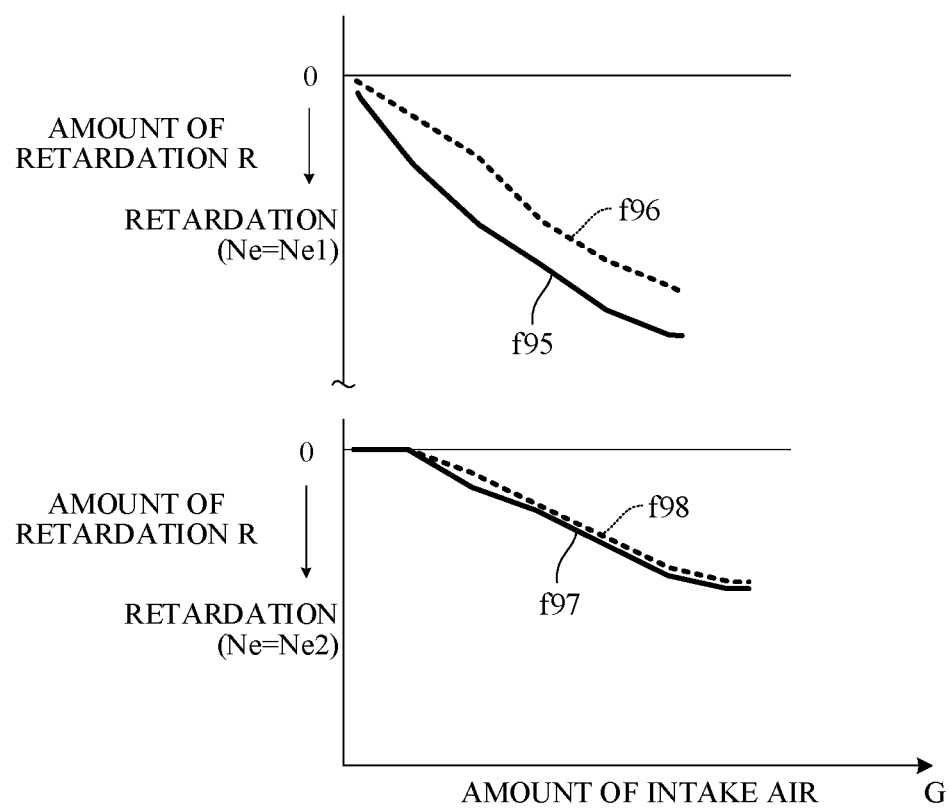
FIG. 12 is a diagram showing an example of an operation of the internal combustion engine control apparatus according to the embodiment of the invention and a relationship between an amount of intake air and an amount of retardation.

FIG. 12 is a diagram showing the relationship between the amount of intake air G and the amount of retardation R. In FIG. 12, characteristics f95 and f96 are characteristics of the amount of retardation R in the homogeneity improvement mode M4 and knock suppression mode M5 under a predetermined engine speed Ne1 (e.g., 2000 rpm); characteristics f97 and f98 are characteristics of the amount of retardation R in the homogeneity improvement mode M4 and knock suppression mode M5 under a predetermined engine speed Ne2 (e.g., 4000 rpm) that is higher than Ne1.

As shown in FIG. 12, when the engine speed is Ne1, the difference between the amount of retardation R in the homogeneity improvement mode M4 and the amount of retardation R in the knock suppression mode M5 is increased as the amount of intake air G is increased. Accordingly, by switching the injection mode from the homogeneity improvement mode M4 (solid line) to the knock suppression mode M5 (dotted line), an increase in the amount of retardation R is suppressed and the combustion efficiency is increased. On the other hand, when the engine speed is Ne2, the fluidity of the mixture is enhanced due to the increase in the engine speed and thus the in-cylinder temperature reduction effect obtained by injecting the fuel in the compression stroke in the knock suppression mode M5 is reduced. As a result, the difference in the amount of retardation R between the homogeneity improvement mode M4 and knock suppression mode M5 is reduced, and even if the injection mode is switched from the homogeneity improvement mode M4 to the knock suppression mode M5, a combustion efficiency increase effect is not obtained. In view of the foregoing, in the present embodiment, a condition that the engine speed is equal to or smaller than a predetermined value Ne3 is added as a knock suppression condition. The predetermined value Ne3 is a value greater than Ne1 and smaller than Ne2 and is previously obtained through an experiment or the like and stored in the memory.

Figure 13:
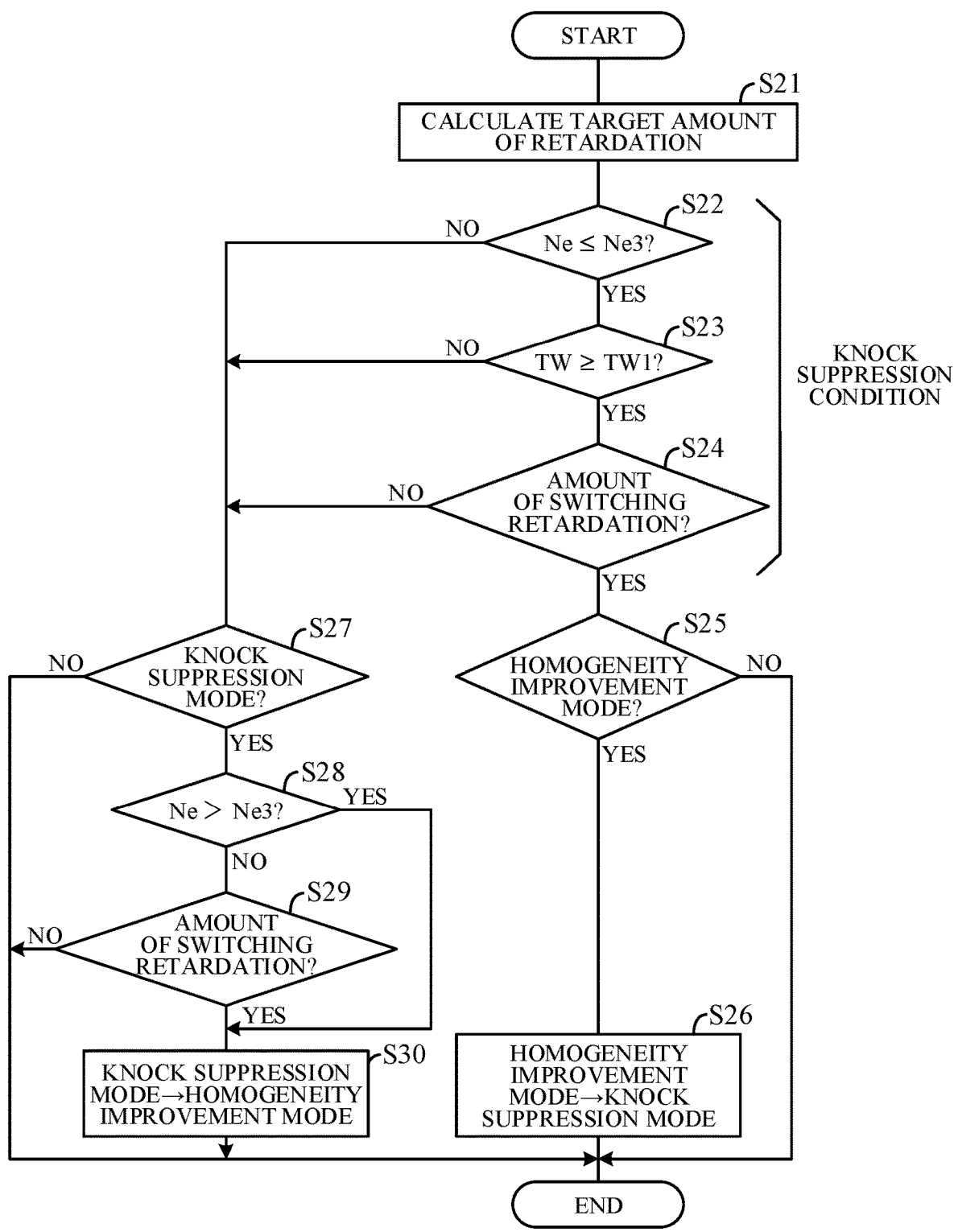
FIG. 13 is a flowchart showing another example of a process performed by a controller in FIG. 3.

FIG. 13 is a flowchart showing an example of a process related to switching between the homogeneity improvement mode M4 and knock suppression mode M5. This flowchart shows steps S10 to S12 of FIG. 7 in more detail, and the process is started when the injection mode is switched to the high in-cylinder temperature mode M7 in S9 of FIG. 7.

As shown in FIG. 13, first, in S21, the amount of retardation of the target ignition timing from the MBT as an optimum ignition timing in the homogeneity improvement mode M4, that is, the target amount of retardation is calculated on the basis of the engine speed Ne detected by the crank angle sensor 31 and the amount of intake air detected by the intake air amount sensor 34. The target amount of retardation is calculated assuming that the injection mode is the homogeneity improvement mode M4, whether the actual injection mode is the homogeneity improvement mode M4 or not. The target amount of retardation in the knock suppression mode M5 is also calculated in S21.

Then, in S22, it is determined whether the engine speed Ne detected by the crank angle sensor 31 is equal to or smaller than the predetermined value Ne3 previously stored in the memory. If the determination in S22 is YES, the process proceeds to S23 and it is determined whether the cooling water temperature TW detected by the water temperature sensor 33 is equal to or greater than the predetermined value TW1 previously stored in the memory. If the determination in S23 is YES, the process proceeds to S24 and it is determined whether the target amount of retardation in the homogeneity improvement mode M4 calculated in S21 has reached the amount of switching retardation Ra previously stored in the memory.

The determinations in S22 to S24 correspond to the knock suppression conditions. If the determination in S24 is YES, that is, if the determinations in S22 to S24 are all YES, it is determined that the knock suppression conditions are satisfied and the process proceeds to S25. In S25, it is determined whether the current injection mode is the homogeneity improvement mode M4. If the determination in S25 is YES, the process proceeds to S26; if the determination in S25 is NO, the process is ended. In S26, the injection mode is switched from the homogeneity improvement mode M4 to the knock suppression mode M5, as in S11 of FIG. 7, ending the process.

On the other hand, if the determination in one of S22 to S24 is NO, it is determined that the knock suppression conditions are not satisfied and the process proceeds to S27. In S27, it is determined whether the current injection mode is the knock suppression mode M5. If the determination in S27 is YES, the process proceeds to S28; if the determination in S27 is NO, the process is ended. In S28, it is determined whether the engine speed Ne detected by the crank angle sensor 31 is greater than the predetermined value Ne3. If the determination in S28 is NO, the process proceeds to S29; if the determination in S28 is YES, the process skips S29 and proceeds to S30.

In S29, it is determined whether the target amount of retardation in the homogeneity improvement mode M4 calculated in S21 has reached the amount of switching retardation Ra, as in S24. If the determination in S29 is YES, the process proceeds to S30; if the determination in S29 is NO, the process is ended. In S30, the injection mode is switched from the knock suppression mode M5 to the homogeneity improvement mode M4, as in S12 of FIG. 7, ending the process.

Figure 14:
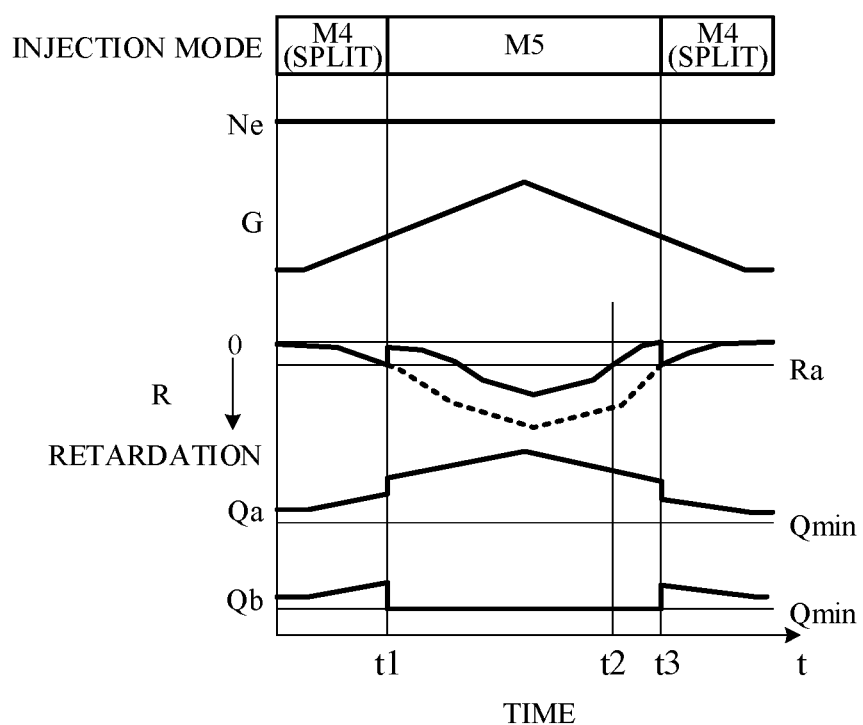
FIG. 14 is a time chart showing an example of an operation of the internal combustion engine control apparatus according to the embodiment of the invention.

The above operation related to switching between the homogeneity improvement mode M4 and knock suppression mode M5 will be described more specifically. FIG. 14 is a time chart showing an example of the operation related to switching between the homogeneity improvement mode M4 and knock suppression mode M5. FIG. 14 shows changes in the engine speed Ne, the amount of intake air G, the amount of retardation R, the first amount of injection Qa in a range from the intake stroke to the compression stroke, and the second amount of injection Qb in the range from the intake stroke to the compression stroke with a lapse of the time t. In FIG. 14, the amount of retardation R of the actual ignition timing is shown by a solid line, and the target amount of retardation in the homogeneity improvement mode M4 is shown by a dotted line.

In FIG. 14, the engine speed is a constant speed that is lower than the predetermined value Ne3. Although not shown, the cooling water temperature TW is equal to or greater than the predetermined value TW1. In the initial state in FIG. 14, the injection mode is the homogeneity improvement mode M4, and both the first amount of injection Qa and the second amount of injection Qb are greater than the minimum amount of injection Qmin. As shown in FIG. 14, as the amount of intake air G is increased with a lapse of time, the amounts of injection Qa and Qb are gradually increased and the amount of retardation R of the ignition timing is also gradually increased.

At time t1, the amount of retardation R reaches the amount of switching retardation Ra and thus the injection mode is switched from the homogeneity improvement mode M4 to the knock suppression mode M5 (S26). As a result, the first injection is performed in the intake stroke, and the second injection is performed in the compression stroke. The amount of injection (the second amount of injection Qb) in the compression stroke is the minimum amount of injection Qmin (FIG. 4). In the knock suppression mode M5, the ignition plug 11 is controlled so that the amount of retardation of the ignition timing becomes the target amount of retardation in the knock suppression mode M5. At this time, the target amount of retardation (dotted line) in the homogeneity improvement mode M4 is continuously calculated, regardless of switching to the knock suppression mode M5 (S21). The switching of the injection mode to the knock suppression mode M5 reduces the amount of retardation R of the ignition timing and increases the combustion efficiency.

Then, at time t2, the amount of intake air G is reduced, and the amount of retardation is reduced compared to the amount of switching retardation Ra. However, the injection mode remains the knock suppression mode M5 unless the target amount of retardation in the homogeneity improvement mode M4 (dotted line) becomes equal to or smaller than the amount of switching retardation Ra. At time t3, the target amount of retardation in the homogeneity improvement mode M4 becomes equal to or smaller than the amount of switching retardation Ra and thus the injection mode is switched from the knock suppression mode M5 to the homogeneity improvement mode M4 (S30).

The amount of retardation (solid line) immediately before the switching of the injection mode is close to the MBT as an optimum ignition timing. As shown in FIG. 8, in an ignition timing range close to the MBT, variations in the output torque T corresponding to changes in the ignition timing are small in amount. That is, the inclination of the characteristic f0 is small. Accordingly, by switching the injection mode provided that the target amount of retardation in the homogeneity improvement mode M4 rather than the target amount of retardation in the knock suppression mode M5 becomes equal to or smaller than the amount of switching retardation Ra, variations in the torque due to the switching of the injection mode are suppressed.

Figure 15:
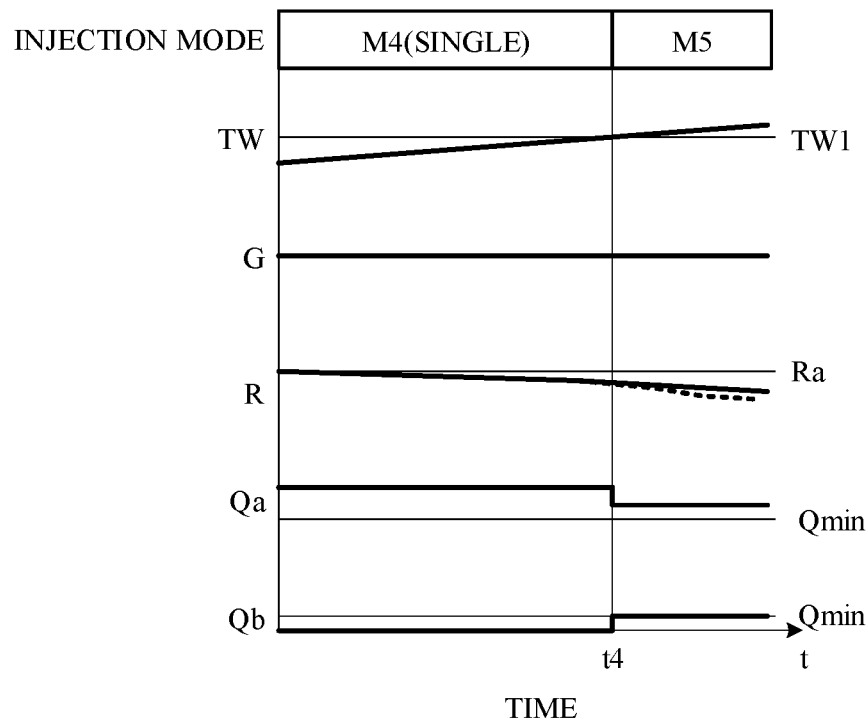
FIG. 15 is a time chart showing another example of an operation of the internal combustion engine control apparatus according to the embodiment of the invention.

FIG. 15 is a time chart showing an example of changes in the cooling water temperature TW, the amount of intake air G, the amount of retardation R, the first amount of injection Qa, and the second amount of injection Qb with a lapse of time. In FIG. 15, at the initial time, the fuel is injected by one-injection intake in the homogeneity improvement mode M4, and the second amount of injection Qb is 0. At the initial time, the amount of retardation R of the ignition timing is greater than the amount of switching retardation Ra, but the cooling water temperature TW is equal to or lower than the predetermined value TW1. Accordingly, the injection mode remains the homogeneity improvement mode M4.

Subsequently, the cooling water temperature TW is increased. At time t4, the cooling water temperature TW becomes equal to or greater than the predetermined value TW1 and thus the injection mode is switched to the knock suppression mode M5 (S26). As a result, if the cooling water temperature TW is low and therefore switching to the knock suppression mode M5 would produce less combustion efficiency improvement effect, useless switching of the injection mode is prevented.

Figure 16:
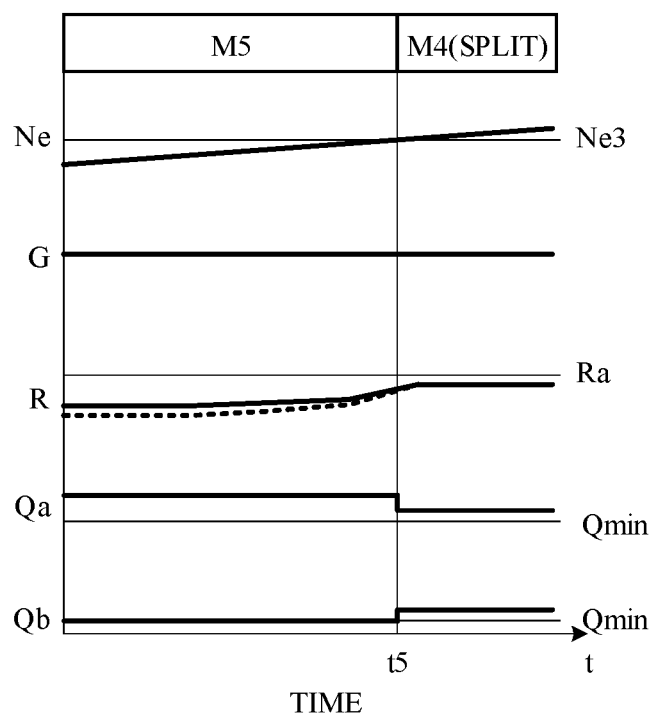
FIG. 16 is a time chart showing further example of an operation of the internal combustion engine control apparatus according to the embodiment of the invention.

FIG. 16 is a time chart showing an example of changes in the engine speed Ne, the amount of intake air G, the amount of retardation R, the first amount of injection Qa, and the second amount of injection Qb with a lapse of time. In FIG. 16, at the initial time, the engine speed Ne is equal to or smaller than the predetermined value Ne3, and the fuel is injected in the intake stroke and compression stroke in the knock suppression mode M5 (S26).

Subsequently, the engine speed Ne is gradually increased. At time t5, the engine speed Ne becomes equal to or greater than the predetermined value Ne3. Thus, the injection mode is switched from the knock suppression mode M5 to the homogeneity improvement mode M4 (S28→S30). Thus, if the engine speed Ne is low and the knock suppression mode M5 produces less combustion efficiency improvement effect, the injection mode is restored to the homogeneity improvement mode M4 earlier.

While, in the present embodiment, the minimum amount of injection Qmin is performed as the second amount of injection Qb in the compression stroke in the knock suppression mode M5, the target amount of injection of the injector 12 may be reduced, resulting in difficulty in performing the minimum amount of injection Qmin in the compression stroke. Specifically, while the injector control unit 305 includes an injection amount calculation unit that calculates the target amount of one injection (the unit amount of injection, such as the first amount of injection Qa or second amount of injection Qb) in each injection mode, the target amount of injection in the compression stroke calculated by the injection amount calculation unit may become smaller than the minimum amount of injection Qmin. In this case, the controller 30 (specifically, the injection mode switching unit 301) performs the following process.

When it is difficult to perform the minimum amount of injection Qmin in the compression stroke, the injection mode switching unit 301 forcibly switches the injection mode to the homogeneity improvement mode M4, that is, a one-injection intake mode, regardless of the process of FIG. 13. Subsequently, even if the target amount of injection is increased and the minimum amount of injection Qmin is allowed to be performed in the compression stroke, the injection mode switching unit 301 does not immediately switch the injection mode to the knock suppression mode M5. In this case, when the amount of retardation R temporarily returns to near the MBT and then the target amount of retardation reaches the amount of switching retardation Ra again, the injection mode switching unit 301 switches the injection mode to the knock suppression mode M5.

Figure 17:
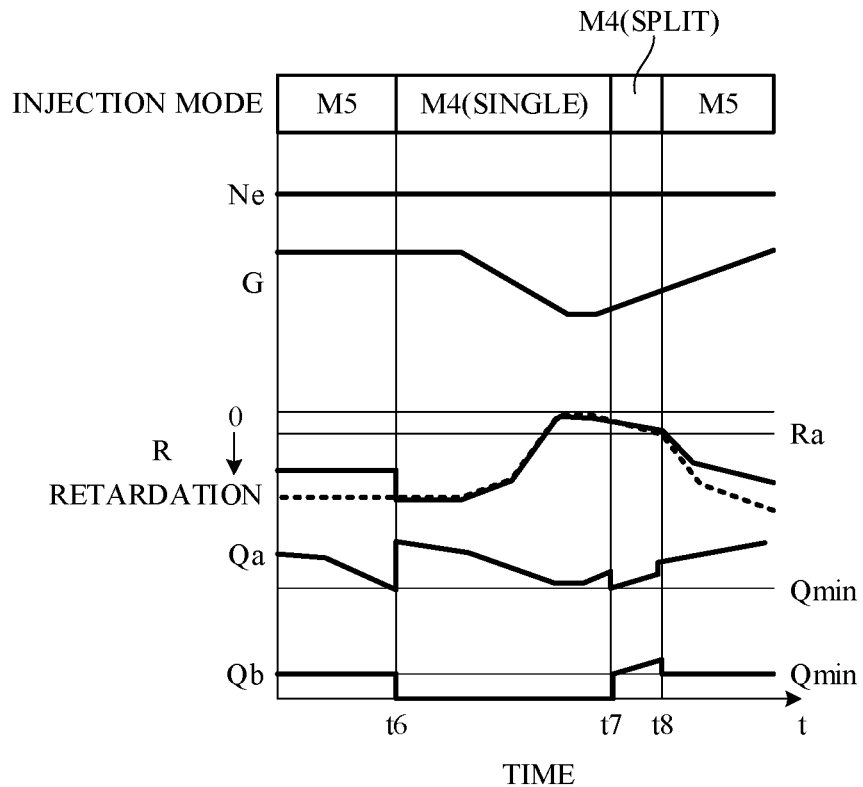
FIG. 17 is a time chart showing further example of an operation of the internal combustion engine control apparatus according to the embodiment of the invention.

FIG. 17 is a time chart showing an example of the above operation. FIG. 17 shows an example of changes in the engine speed Ne, the amount of intake air G, the amount of retardation R, the first amount of injection Qa, and the second amount of injection Qb with a lapse of time. In FIG. 17, at the initial time, the injection mode is the knock suppression mode M5, and the amount of injection (the second amount of injection) Qb in the compression stroke is the minimum amount of injection Qmin. Subsequently, for example, fuel gas is guided to the intake system through the purge passage and thus the amount of injection (the first amount of injection) Qa in the intake stroke is reduced. At time t6, the amount of injection (the first amount of injection) Qa becomes equal to or smaller than the minimum amount of injection Qmin and thus the injection mode is forcibly switched to the homogeneity improvement mode M4 (one-injection intake), allowing the injector 12 to perform the target amount of injection.

Subsequently, the amount of intake air G is reduced with the engine speed Ne being constant and thus the amount of retardation R is reduced. However, even if the amount of retardation R becomes equal to or smaller than the amount of switching retardation Ra, the injection mode remains the homogeneity improvement mode M4. At time t7, the target amount of injection is increased and thus the injection mode is switched from one-injection intake to two-injection intake. At time t8, the target amount of retardation reaches the amount of switching retardation Ra and thus the injection mode is switched to the knock suppression mode M5. As a result, the fuel is injected in the minimum amount Qmin in the compression stroke. In FIG. 17, the ignition timing returns to neat the MBT and then the injection mode is switched to the knock suppression mode M5 (time t8). Thus, variations in the torque due to the switching of the injection mode are suppressed.

In the knock suppression mode M5 of FIG. 17, the first amount of injection Qa becomes the minimum amount of injection Qmin, and the second amount of injection Qb becomes 0. On the other hand, in the homogeneity improvement mode M4, the second amount of injection Qb is originally 0. For this reason, even if the knock suppression conditions are satisfied, the injection mode switching unit 301 does not switch the injection mode to the knock suppression mode M5 but rather maintains the homogeneity improvement mode M4 (one-injection intake). Subsequently, the target amount of injection is increased, and the minimum amount of injection Qmin is allowed to be performed in the compression stroke. If the knock suppression conditions are satisfied at that time, the injection mode switching unit 301 immediately switches the injection mode to the knock suppression mode M5.

Figure 18:
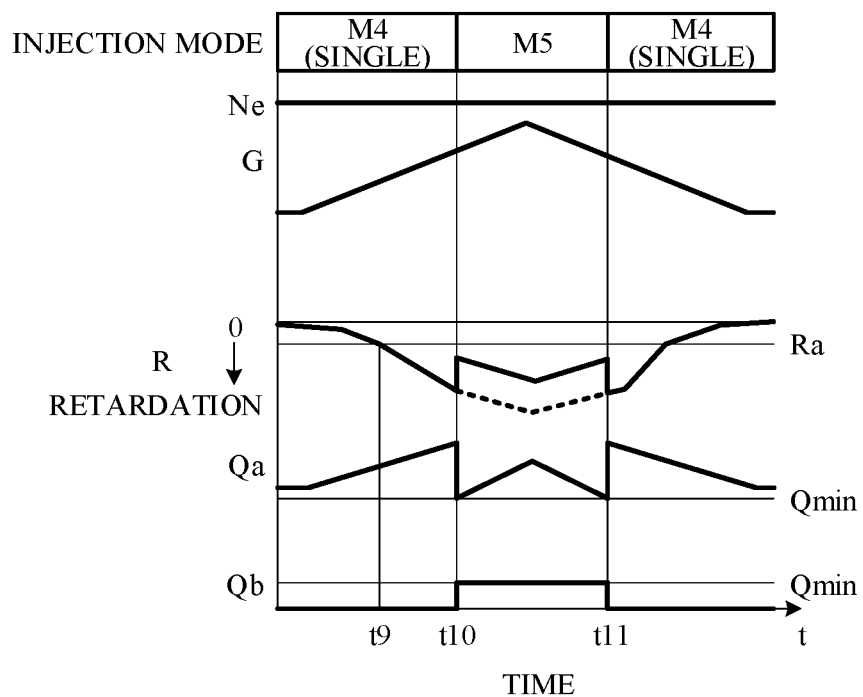
FIG. 18 is a time chart showing further example of an operation of the internal combustion engine control apparatus according to the embodiment of the invention.

FIG. 18 is a time chart showing an example of this operation. FIG. 18 shows an example of changes in the engine speed Ne, the amount of intake air G, the amount of retardation R, the first amount of injection Qa, and the second amount of injection Qb with a lapse of time. In FIG. 18, at the initial time, the injection mode is the homogeneity improvement mode M4 (one-injection intake), and the amount of injection (the second amount of injection) Qb in the compression stroke is 0. The engine speed Ne is kept constant, and the amount of retardation R is increased as the amount of intake air G is increased. At time 9, the amount of retardation R becomes equal to or greater than the amount of switching retardation Ra and thus the knock suppression conditions are satisfied. However, the injection mode remains the homogeneity improvement mode M4 (one-injection intake) unless the target amount of injection in the compression stroke is increased to the minimum amount of injection Qmin.

Subsequently, at time t10, the target amount of injection in the compression stroke is increased to the minimum amount of injection Qmin and thus the injection mode is immediately switched to the knock suppression mode M5. In this case, the injection mode is switched to the knock suppression mode M5 without waiting for the amount of retardation R to be reduced to near the MBT. At time t11, the target amount of injection is reduced, resulting in difficulty in performing the minimum amount of injection Qmin in the compression stroke. Thus, the injection mode is switched to the homogeneity improvement mode M4 (one-injection intake) again.

The present embodiment can further achieve advantages and effects such as the following:

(1) The internal combustion engine control apparatus according to the present embodiment is configured to control the engine 1 including the piston 103 that reciprocates in the cylinder 102, the injector 12 that injects the fuel into the combustion chamber 105 facing the piston 103 in the cylinder 102, and the ignition plug 11 that ignites the air-fuel mixture in the combustion chamber 105 (FIG. 2). This control apparatus includes the injection mode switching unit 301 that switches the injection mode between the homogeneity improvement mode M4, in which the fuel is injected in a range including the intake stroke and compression stroke, in particular, in the intake stroke, and the knock suppression mode M5, in which the fuel is injected in a range including the intake stroke and compression stroke, in particular, in the compression stroke; the ignition control unit 304 (knock suppression degree calculation unit) that calculates the degree of knock suppression determined in accordance with the amount of retardation R of the ignition timing for suppressing knocks; and the knock determination unit 303D that determines whether the injection mode needs to be switched between the homogeneity improvement mode M4 and knock suppression mode M5, on the basis of the degree of knock suppression calculated by the ignition control unit 304 (FIGS. 3, 6). Since it is determined whether the injection mode needs to be switched, on the basis of the degree of knock suppression, it is easily and favorably determined whether the injection mode needs to be switched, without having to consider various factors that influence knocks, such as environmental conditions and the octane rating of the fuel.

(2) The knock suppression degree calculation unit is the ignition control unit 304 (retardation calculation unit) that calculates the amount of retardation R (the target amount of retardation) of the target ignition timing for suppressing knocks of engine 1 from the MBT, at which the output torque is maximized, when the injection mode is switched to the homogeneity improvement mode M4 by the injection mode switching unit 301. The knock determination unit 303D determines whether the injection mode needs to be switched from the homogeneity improvement mode M4 to the knock suppression mode M5, on the basis of the target amount of retardation calculated by the ignition control unit 304 (FIGS. 3, 6). Thus, it is easily and favorably determined whether the injection mode needs to be switched from the homogeneity improvement mode M4 to the knock suppression mode M5, without having to consider various factors that influence knocks, such as environmental conditions and the octane rating of the fuel.

(3) When the target amount of retardation calculated by the ignition control unit 304 (retardation calculation unit) reaches the amount of switching retardation Ra, the knock determination unit 303D determines whether the injection mode needs to be switched from the homogeneity improvement mode M4 to the knock suppression mode M5. When the knock determination unit 303D determines that the injection mode needs to be switched from the homogeneity improvement mode M4 to the knock suppression mode M5, the injection mode switching unit 301 switches the injection mode from the homogeneity improvement mode M4 to the knock suppression mode M5 (FIG. 13). That is, the injection mode is switched from the homogeneity improvement mode M4 to the knock suppression mode M5 at a proper timing, resulting in an effective increase in the combustion efficiency.

(4) After the injection mode switching unit 301 switches the injection mode from the homogeneity improvement mode M4 to the knock suppression mode M5, the ignition control unit 304 (retardation calculation unit) calculates the target amount of retardation of the target ignition timing from the MBT assuming that the homogeneity improvement mode M4 is continuing (FIG. 13). The knock determination unit 303D determines whether the injection mode needs to be switched from the knock suppression mode M5 to the homogeneity improvement mode M4, on the basis of the target amount of retardation calculated by the retardation calculation unit (FIG. 13). If the knock determination unit 303D determines that the injection mode needs to be switched from the knock suppression mode M5 to the homogeneity improvement mode M4 after the injection mode is switched from the homogeneity improvement mode M4 to the knock suppression mode M5, the injection mode switching unit 301 switches the injection mode from the knock suppression mode M5 to the homogeneity improvement mode M4 (FIG. 14). That is, the injection mode is switched from the knock suppression mode M5 to the homogeneity improvement mode M4 when the ignition timing is near the MBT, resulting in suppression of variations in the output torque due to the switching of the injection mode.

(5) The homogeneity improvement mode M4 is an injection mode in which the fuel is injected in the intake stroke, and the knock suppression mode M5 is an injection mode in which the fuel is injected in the intake stroke and compression stroke. The amount of injection (the second amount of injection Qb) in the compression stroke in the knock suppression mode M5 is less than the amount of injection (the first amount of injection Qa) in the intake stroke in the knock suppression mode M5 (FIG. 14). This means that a larger amount of fuel is injected in the intake stroke and therefore a uniform mixture is more likely to be produced in the combustion chamber 105. The homogeneity improvement mode M4 may be an injection mode in which the fuel is injected in a range extending over the intake stroke and compression stroke or in the compression stroke.

(6) The internal combustion engine control apparatus further includes the injector control unit 305 (injection amount calculation unit) that calculates the target amounts of injection in the intake stroke and compression stroke in the knock suppression mode M5 (FIG. 3). If the target amount of injection in the compression stroke calculated by the injection amount calculation unit becomes equal to or smaller than the minimum amount Qmin of the fuel injectable by the injector 12 in one injection, the injection mode switching unit 301 switches the injection mode from the knock suppression mode M5 to the homogeneity improvement mode M4 (FIG. 17). Thus, even if the target amount of injection is reduced, stable combustion is continued.

(7) If the injection mode switching unit 301 switches the injection mode from the knock suppression mode M5 to the homogeneity improvement mode M4 and then the target amount of retardation calculated by the ignition control unit 304 (retardation calculation unit) becomes smaller than the amount of switching retardation Ra and then reaches the amount of switching retardation Ra, the knock determination unit 303D determines that the injection mode needs to be switched from the homogeneity improvement mode M4 to the knock suppression mode M5 (FIG. 17). Therefore, the injection mode is switched from the homogeneity improvement mode M4 to the knock suppression mode M5 when the ignition timing is near the MBT, resulting in suppression of variations in the output torque.

Figure 19:
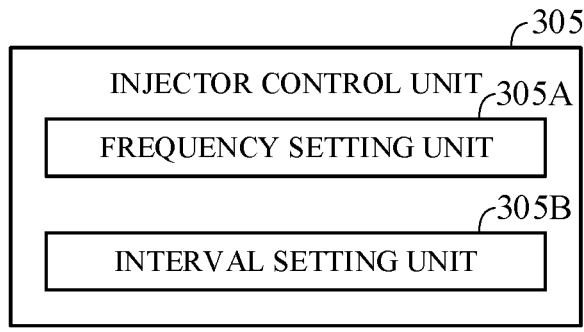
FIG. 19 is a block diagram showing the configuration of an injector control unit of FIG. 3 in detail.

Next, the adherence reduction mode M3 among the injection modes of FIG. 4 will be described in more detail. As described above, in the adherence reduction mode M3, the injector control unit 305 (FIG. 3) outputs control signals to the injector 12 so that the injector 12 injects the fuel in accordance with the predetermined map of FIG. 5. FIG. 19 is a block diagram showing the configuration of the injector control unit 305 in more detail.

As shown in FIG. 19, the injector control unit 305 includes a frequency setting unit 305A that sets the injection frequency per cycle of the injector 12 and an interval setting unit 305B that sets the injection intervals at which the fuel is injected multiple times in one cycle from the start of the intake stroke to the end of the exhaust stroke. In the adherence reduction mode M3, the fuel is injected within a predetermined injectable area so that adherence of the fuel to the piston crown surface 103a, the inner wall surface of the cylinder 102, or the like is suppressed in a low in-cylinder temperature state.

Figure 20:
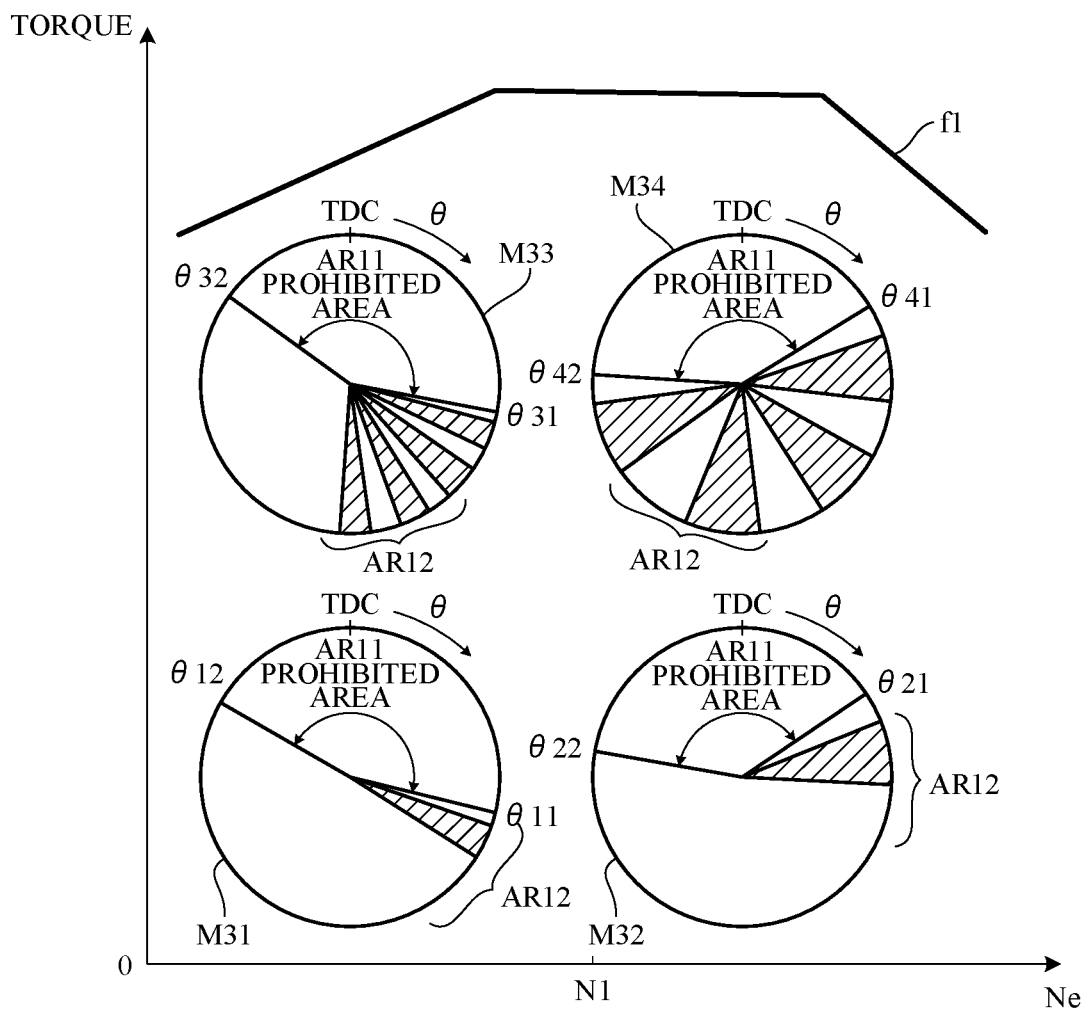
FIG. 20 is a diagram showing an example of injection patterns in the adherence reduction mode of FIG. 4.

FIG. 20 is a diagram showing an example of injection patterns of the injector 12 in the adherence reduction mode M3 using multiple injection models M31 to M34 associated with the engine speed Ne and output torque. A characteristic f1 in FIG. 20 is a characteristic of the maximum output torque. In FIG. 20, the injection models M31 and M32, whose injection frequency is once, and the injection models M33 and M34, whose the injection frequency is four times, are shown as an example. The injection model M32 is an injection model whose engine speed Ne is higher than that of the injection model M31, and the injection model M34 is an injection model whose engine speed Ne is higher than that of the injection model M33.

If the injection frequency is four times, the engine speed Ne is equal to or smaller than the predetermined value N1 (e.g., 3000 rpm) (see FIG. 5). For example, the engine speed Ne corresponding to the injection model M34 is the predetermined value N1. The injection frequency of the low-torque injection models M31 and M32 is once, and the injection frequency of the high-torque injection models M33 and M34 is four times (see FIG. 5. That is, FIG. 20 shows the models of FIG. 5 whose injection frequency is once or four times such that the models are classified into two groups in accordance with the engine speed Ne.

In FIG. 20, the crank angle in the entire area (=360°) from the start of the intake stroke (the intake top dead center (TDC)) to the end of the compression stroke (the compression top dead center (TDC)) is represented by the angle θ of a clockwise circle having the intake top dead center (TDC) as the start point, and the fuel injection timing(s) is represented by a hatched sector(s) extending radially from the center of the circle. As shown in FIG. 20, a prohibited area AR11 in which fuel injection is prohibited is set in the entire area from the intake top dead center TDC to the compression top dead center TDC, and an area AR12 obtained by excluding the prohibited area AR11 from the entire area serves as an injectable area.

In the injection model M31, a range from the intake top dead center (TDC) to a crank angle θ11 and a range from a crank angle θ12 to the compression top dead center (TDC) are set as a prohibited area AR11; in the injection model M32, a range from the intake top dead center (TDC) to a crank angle θ21 and a range from a crank angle θ22 to the compression top dead center (TDC) are set as a prohibited area AR11; in the injection model M33, a range from the intake top dead center (TDC) to a crank angle θ31 and a range from a crank angle θ32 to the compression top dead center (TDC) are set as a prohibited area AR11; and in the injection model M34, a range from the intake top dead center (TDC) to a crank angle θ41 and a range from a crank angle θ42 to the compression top dead center (TDC) are set as a prohibited area AR11.

Figure 21:
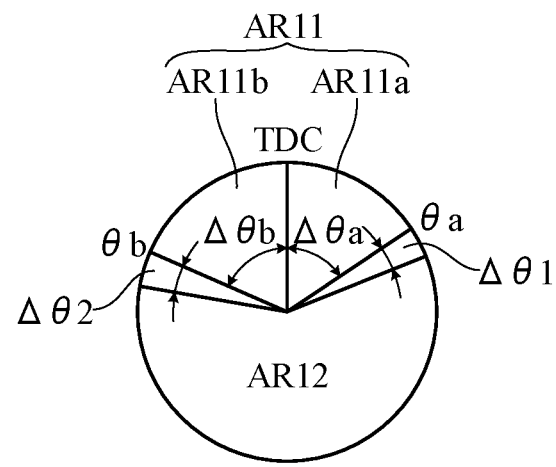
FIG. 21 is a diagram showing a distinction between a prohibited area and an injectable area.

FIG. 21 is a diagram showing the distinction between a prohibited area AR11 and an injectable area AR12. A crank angle θa in FIG. 21 corresponds to the crank angles θ11, θ21, θ31, and θ41 in FIG. 20, and a crank angle θb corresponds to the crank angles θ12, θ22, θ32, and θ42. In FIG. 21, a range from the intake top dead center (TDC) to the crank angle θa is represented by Δθa, and a range from the crank angle θb to the compression top dead center (TDC) is represented by Δθb. As shown in FIG. 21, the prohibited area AR11 includes a first prohibited area AR11a obtained by increasing the crank angle θ from the intake top dead center (TDC) by Δθa and a second prohibited area AR11b obtained by reducing the crank angle θ from the compression top dead center (TDC) by Δθb.

Figure 22:
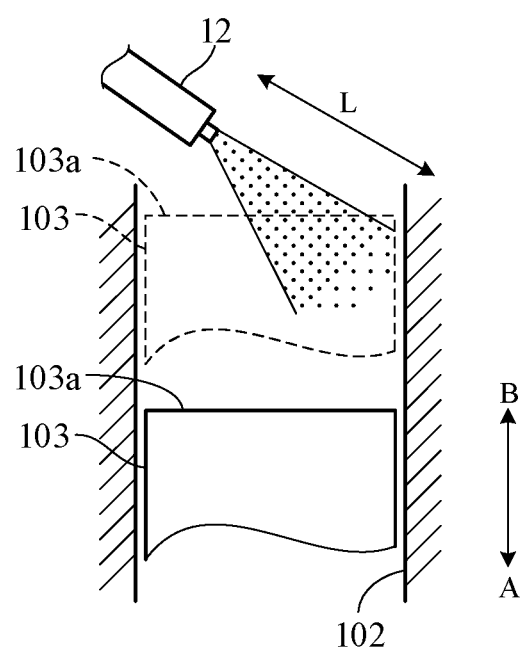
FIG. 22 is a drawing schematically showing a fuel injection operation of an injector to which the internal combustion engine control apparatus according to the embodiment of the present invention is applied.

FIG. 22 is a drawing schematically showing the fuel injection operation of the injector 12. As shown in FIG. 22, a condition to prevent adherence of the fuel to the piston crown surface 103a is that the piston 103 is lowered from the intake top dead center (TDC) (dotted line) in the direction of an arrow A by a predetermined amount or more, that is, that the piston 103 is retreated from the injector 12 to a first predetermined distance that spray from the injector 12 does not reach. As the engine speed Ne becomes higher, the descending speed of the piston 103 (the speed at which the piston 103 retreats from the top dead center (TDC)) becomes higher and therefore the first predetermined distance can be set to a shorter value.

Accordingly, as shown in FIG. 20, the high speed-side crank angles θ21 and θ41 are set to smaller values than the low speed-side crank angles θ11 and θ31. If the injection models M31 and M33 have the same engine speed and if the injection models M32 and M34 have the same engine speed, the crank angles θ11 and θ31 defining the prohibited areas AR11 are set to the same value and the crank angles θ21 and θ41 defining the prohibited areas AR11 are also set to the same value. The crank angles θ11, θ21, θ31, and θ41 defining the prohibited areas AR11 may be set in the first half of the intake stroke, and the low speed-side crank angles θ11 and θ31 may be set to larger values than the high speed-side crank angles θ21 and θ41.

Another condition to prevent adherence of the fuel to the piston crown surface 103a is that the distance from the compression top dead center (TDC) is equal to or greater than a predetermined amount when the piston 103 is raised in the direction of an arrow B toward the compression top dead center (TDC), that is, that the piston 103 is away from the compression top dead center (TDC) by a second predetermined distance or more that spray from the injector 12 does not reach. As the engine speed Ne becomes lower, the ascending speed of the piston 103 (the speed at which piston 103 approaches the top dead center (TDC)) becomes lower and therefore the second predetermined distance can be set to a shorter value.

Accordingly, the low speed-side crank angles θ12 and θ32 are set to larger values than the high speed-side crank angles θ22 and θ42. If the injection models M31 and M33 have the same engine speed and if the injection models M32 and M34 have the same engine speed, the crank angles θ12 and θ32 defining the prohibited areas AR11 are set to the same value and the crank angles θ22 and θ42 defining the prohibited areas AR11 are also set the same value. In summary, as the engine speed is increased, the intake stroke-side and compression stroke-side crank angles defining the prohibited areas AR11 are set so as to be shifted toward the intake top dead center TDC and the compression top dead center TDC, respectively (crank angles θ11, θ31→crank angles θ21, θ41, crank angles θ12, θ32→crank angles θ22, θ42).

Figure 23:
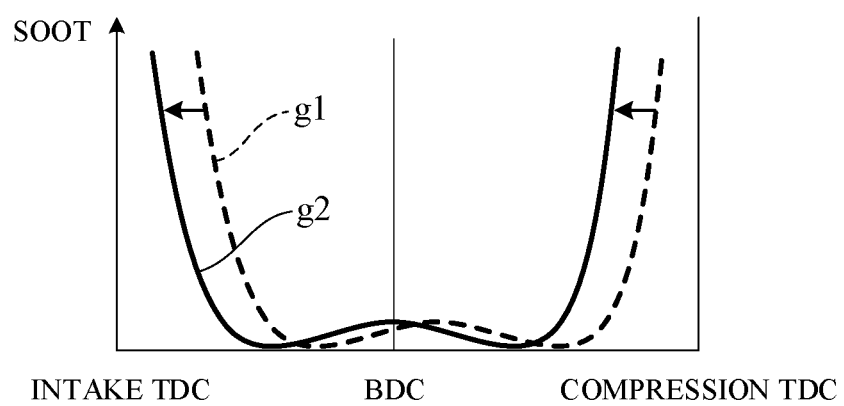
FIG. 23 is a diagram showing the relationship between a fuel injection timing and an amount of adhering soot in the internal combustion engine control apparatus according to the embodiment of the present invention.

FIG. 23 is a diagram showing the relationship between the fuel injection timing and the amount of adhering soot. The lateral axis represents changes in the fuel injection timing in a range from the intake top dead center (intake TDC) to the compression top dead center (compression TDC); BDC represents the bottom dead center; a characteristic g1 (dotted line) is a characteristic representing the amount of adhering soot in a low-engine-speed area; and a characteristic g2 (solid line) is a characteristic representing the amount of adhering soot in a high-engine-speed area. As shown in FIG. 23, the amount of adhering soot is increased as the fuel injection timing approaches any of the intake top dead center and compression top dead center. Also, the characteristic of the amount of adhering soot is shifted toward the intake top dead center as shown by arrows as the engine speed is increased. In FIG. 23, the amount of adhering soot is minimized in an area around the midpoint between the intake top dead center (TDC) and the bottom dead center BDC and an area around the midpoint between the compression top dead center (TDC) and the bottom dead center BDC. When the crank angle is shifted from those areas toward the intake top dead center (TDC) or the compression top dead center (TDC), the amount of adhering soot is sharply increased.

The above-mentioned crank angles θ11, θ12, θ21, θ22, θ31, θ32, θ41, and θ42 for regulating adherence of the fuel to the piston crown surface 103a are previously obtained through an experiment or the like and stored in the memory. The frequency setting unit 305A sets the frequency at which the fuel is injected in the injectable areas AR12 defined by these crank angles, to one to four times on the basis of the engine speed Ne and target amount of injection Q or the amount of intake air G in accordance with the predetermined characteristic of FIG. 5.

In this case, as shown in FIG. 21, margins are set on the prohibited area AR1 by adding predetermined crank angles Δθ1 and Δθ2 to the prohibited area AR1, and the injectable area AR12 is narrowed accordingly. Thus, even if there are variations in the size or variations in the mounting position due to the individual differences between the parts, adherence of soot to the piston crown surface 103a or the like is reliably prevented. The predetermined crank angle Δθ1 is set to a smaller value as the engine speed Ne becomes higher, and the predetermined crank angle Δθ2 is set to a larger value as the engine speed Ne becomes higher.

When the crank angle θ detected by the crank angle sensor 31 becomes the target crank angle obtained by adding the predetermined crank angle Δθ1 to the crank angle θ11, θ21, θ31, or θ41, the injector control unit 305 of FIG. 19 outputs control signals to the injector 12 to start the first injection. If the injection frequency set by the frequency setting unit 305A is multiple times (e.g., four times), the injector control unit 305 starts the second injection at a predetermined time interval Δt after performing the first injection.

The time interval Δt between the end of the first injection and the start of the second injection, the time interval Δt between the end of the second injection and the start of the third injection, and the time interval Δt between the end of the third injection and the start of the fourth injection are the same. The time interval Δt is constant regardless of the engine speed Ne. Accordingly, a comparison between the injection model M33 and injection model M34 of FIG. 20 reveals that the crank angle θ at the end of the fourth injection of the injection model M34 is larger than the crank angle θ at the end of the fourth injection of the injection model M33.

Figure 24:
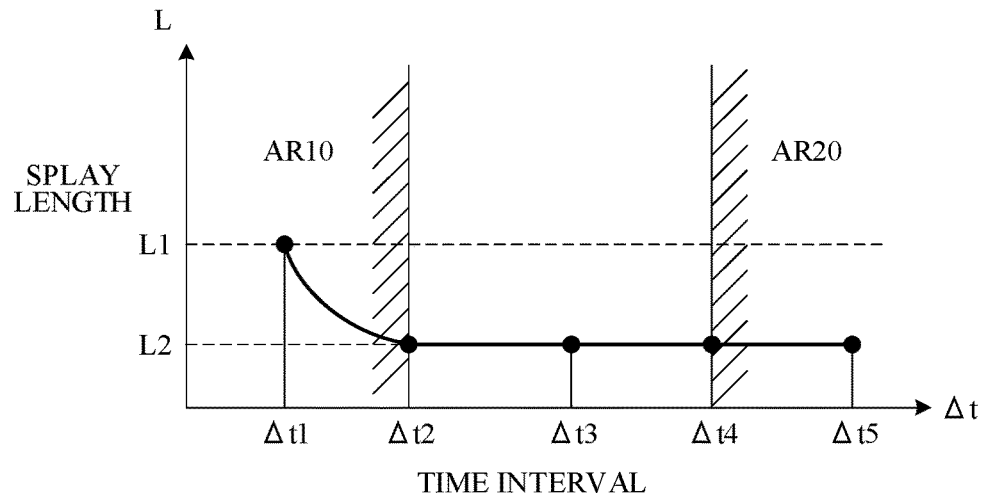
FIG. 24 is a diagram showing a relationship between a time interval from an end of the first injection to a start of the second injection and a spray length.

The time interval Δt is set by the interval setting unit 305B of FIG. 19 so as to satisfy a predetermined condition. FIG. 24 is a diagram showing the relationship between the time interval Δt from the end of the first injection to the start of the second injection and the spray length L of the second injection when a predetermined amount of fuel is split-injected by the injector 12, for example, when the injection frequency is twice. This relationship is obtained through an experiment or analysis. As shown in FIG. 22, the spray length L is the length from the tip of the injector 12 to the tip of spray (the distance reached by the spray tip), that is, penetration. In FIG. 24, the spray length of single injection is represented by L1. The amount of one injection of single injection is greater than the amount of one injection of split injection and is, for example, twice that when the injection frequency is twice. That is, FIG. 24 shows the relationship between the time interval Δt and the spray length L provided that the total amount of injection per cycle obtained by adding up the amounts of injection of split injection and the amount of injection per cycle during single injection are the same.

As shown in FIG. 24, the spray length L during split injection is L1 when the time interval is Δt1 (e.g., 0.5 ms). In a time interval range equal to or greater than Δt1, the spray length L is sharply reduced as the time interval is increased. The spray lengths L corresponding to the time intervals Δt2 (e.g., 0.8 ms), Δt3 (e.g., 1.5 ms), Δt4 (e.g., 2.0 ms), and Δt5 (e.g., 2.5 ms) are all L2 (<L1). For example, L2 is equal to or smaller than 50% of L1. The reason why the spray length is longer when the time interval Δt is shorter, that is, when the time interval is in an area AR10 of less than Δt2 is that a slipstream effect is produced by the immediately preceding spray. More specifically, when the time interval is Δt2, the fuel and ambient air exchange momentum at more opportunities and thus the spray tip penetration (spray length L) is reduced. On the other hand, when the time interval is less than Δ2 (area AR10), the spray injected currently catches up with the spray injected last time and momentum exchange opportunities are reduced, resulting in extension of the spray tip penetration. Accordingly, by setting the time interval to Δt2 or more, the spray length L is reduced from L1 to L2 and thus adherence of soot to the piston crown surface 103a is suppressed.

However, if the time interval Δt is too long in, for example, four-stage injection, the crank angle θ at the start of the first injection and the crank angle θ at the end of the fourth injection may enter the prohibited area AR11a and AR11b of FIG. 21 and thus soot may adhere to the piston crown surface 103a. Also, if the end of the fourth injection is late, the fuel and air may be insufficiently mixed, resulting in unstable combustion. More specifically, such a problem occurs in a time interval area AR20 longer than Δt4. For this reason, the time interval Δt4 (e.g., 2.0 ms) is set as the longest time interval Δt, and the interval setting unit 305B set the target time interval Δta in a range equal to or greater than Δt2 and equal to or smaller than Δt4 s in the case of multiple-stage injection (Δt2≤Δta≤t4).

In other words, the interval setting unit 305B sets, as the target time interval Δta, the time interval Δt such that the spray length L becomes shorter than the spray length L1 of single injection and is constant (L2) with respect to changes in the time interval Δt and such that adherence of soot is suppressed. This target time interval Δta is previously stored in the memory. The injector control unit 305 controls the ignition timing by outputting control signals to the injector 12 so that the time interval Δt of multi-stage injection becomes the target time interval Δta. Thus, the spray length L is reduced, resulting in effective suppression of adherence of soot to the piston crown surface 103a or the like.

Figure 25:
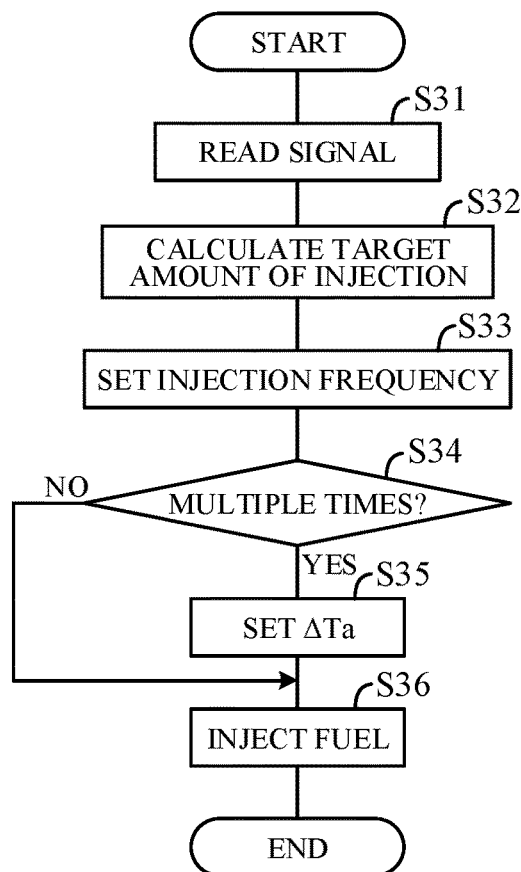
FIG. 25 is a flowchart showing an example of a process performed by injector control unit in FIG. 19.

FIG. 25 is a flowchart showing an example of a process performed by the injector control unit 305 in the adherence reduction mode M3. The process shown by this flowchart is started when the injection mode is switched to the adherence reduction mode M3, and repeated at a predetermined cycle as long as the adherence reduction mode M3 is continued.

As shown in FIG. 25, first, in S31, the injector control unit 305 reads signals from the crank angle sensor 31, intake air amount sensor 34, AF sensor 35, and the like. Then, in S32, the injector control unit 305 calculates the target amount of injection such that the actual air-fuel ratio becomes a theoretical air-fuel ratio, on the basis of the signals from the intake air amount sensor 34 and AF sensor 35. Then, in S33, the injector control unit 305 sets the injection frequency per cycle of the injector 12 in accordance with the map of FIG. 5 on the basis of the engine speed detected by the crank angle sensor 31 and the amount of intake air detected by the intake air amount sensor 34, and the like. The injection frequency is set such that the fuel can be injected at that frequency in the injectable area AR12.

Then, in S34, the injector control unit 305 determines whether the injection frequency set in S33 is multiple times, that is, whether split injection (multi-stage injection) is needed. If the determination in S34 is YES, the process proceeds to S35 and the injector control unit 305 sets the target time interval Δta in a range from Δt2 to Δt4 of FIG. 24. For example, the injector control unit 305 sets a predetermined target time interval Δta previously stored in the memory. The injector control unit 305 may set the target time interval Δta in the range from Δt2 to Δt4 in accordance with the engine speed, the amount of intake air, the cooling water temperature, or the like.

Then, in S36, the injector control unit 305 calculates the target amount of one injection (the unit amount of injection) and outputs control signals to the injector 12 so that the fuel is injected in the unit amount at the frequency set in S33 in the injectable area AR12. For example, in the case of single injection, the unit amount of injection serves as the target amount of injection, and when the crank angle becomes a value obtained by adding the predetermined crank angle Δθ1 as a margin to θa as shown in FIG. 21, the injector control unit 305 outputs control signals to the injector 12 so that injection in the target amount is started. In the case of split injection (multi-stage injection) in which injection is performed two to four times in one cycle, when the crank angle becomes a value obtained by adding the predetermined crank angle Δθ1 as a margin to θa as shown in FIG. 21, the injector control unit 305 outputs control signals to the injector 12 so that injection in the unit amount is started and the target time interval Δta is made between the preceding injection and the following injection.

The present embodiment can further achieve advantages and effects such as the following:

(1) The internal combustion engine control apparatus according to the present embodiment is configured to control the engine 1 including the piston 103 that reciprocates in the cylinder 102 and the injector 12 that injects the fuel into the combustion chamber 105 facing the piston 103 in the cylinder 102 (FIG. 2). This control apparatus includes the injector control unit 305 that controls the injector 12 so that the fuel is injected in the injectable area AR12 obtained by excluding, from the range from the intake top dead center (TDC), at which the intake stroke is started, to the compression top dead center (TDC), at which the compression stroke is ended, the first prohibited area AR11a obtained by increasing the crank angle θ from the intake top dead center (TDC) by the predetermined angle Δθa and the second prohibited area AR11b obtained by reducing the crank angle θ from the compression top dead center (TDC) by the predetermined angle Δθb (FIGS. 3, 21). The injector control unit 305 includes the frequency setting unit 305A that sets the injection frequency at which the fuel is injected by the injector 12 in the injectable area AR12 (FIG. 19). The frequency setting unit 305A sets the injection frequency to one to four times (FIGS. 5, 20). Thus, the injection frequency in an operation state in which soot is more likely to adhere is increased to up to four times. This allows for a reduction in the spray length L from the injector 12 and thus effective suppression of adherence of soot to the piston crown surface 103a or the like.

(2) The internal combustion engine control apparatus further includes the intake air amount sensor 34 that detects the amount of intake air G having a correlation with the output torque of the engine 1 (FIG. 3). The frequency setting unit 305A sets the injection frequency such that the injection frequency is increased with increases in the output torque corresponding to the amount of intake air G detected by the intake air amount sensor 34 (FIGS. 5, 20). Thus, the output torque is increased while adherence of soot is reduced.

(3) The internal combustion engine control apparatus further includes the crank angle sensor 31 that detects the engine speed Ne (FIG. 3). The frequency setting unit 305A sets the injection frequency such that the injection frequency is reduced with increases in the engine speed Ne detected by the crank angle sensor 31 (FIG. 5). An increase in the engine speed Ne reduces the injection time corresponding to the injectable area AR12 and makes it difficult to make a sufficient time interval $\Delta t$ when performing fuel injection; however, by reducing the injection frequency, a sufficient time interval $\Delta t$ is made so that the spray length L is suppressed.

(4) The injectable area AR12 is set such that increases in the engine speed Ne detected by the crank angle sensor 31 lead to reduction of the first prohibited area AR11a and expansion of the second prohibited area AR11b (FIG. 21). Specifically, the crank angles $\theta 21$ and $\theta 41$ are set to smaller angles than the crank angles $\theta 11$ and $\theta 31$, and the crank angles $\theta 22$ and $\theta 42$ are set to smaller angles than the crank angles $\theta 12$ and $\theta 32$ (FIG. 20). Increases in the engine speed Ne increase the speed at which the piston 103 retreats from the injector 12 and the speed at which the piston 103 approaches the injector 12; however, by setting the prohibited area AR11 in accordance with the engine speed Ne as described above, adherence of soot to the piston crown surface 103a is favorably suppressed.

(5) The internal combustion engine control apparatus further includes the temperature information acquisition unit 302 that acquires information on the temperature in the cylinder 102 and the in-cylinder temperature determination unit 303C that determines whether warm-up in the cylinder 102 is complete, that is, whether the in-cylinder temperature has become a high in-cylinder temperature, on the basis of the temperature information acquired by the temperature information acquisition unit 302 (FIGS. 3, 6). If the in-cylinder temperature determination unit 303C determines that warm-up in the cylinder 102 is not complete, that is, if the injection mode is the adherence reduction mode M3, the injector control unit 305 controls the injector 12 so that the fuel is injected in the injectable area AR12 at the frequency set by the frequency setting unit 305A (FIG. 4). Up-to-four-stage injection in the injectable area AR12 may lead to injection in the first half of the compression stroke (the injection model M34 in FIG. 20). In the present embodiment, however, up-to-four-stage injection is performed only in an operation state in which soot occurs. This reduces the frequency of injection in the compression stroke and increases the homogeneity of the mixture, thereby increasing the combustion efficiency.

(6) As an aspect different from the above (1) to (5), the internal combustion engine control apparatus includes the injector control unit 305 that controls the injector 12 so that the fuel is injected in an equal amount multiple times at predetermined target time intervals $\Delta ta$ in a range from the start of the intake stroke to the end of the compression stroke (FIGS. 3, 21). The injector control unit 305 includes the interval setting unit 305B that sets the target time interval $\Delta ta$ (FIG. 19). The interval setting unit 305B sets the target time interval $\Delta ta$ such that the spray length L, which is the distance from the tip of the injector 12 to the tip of fuel spray injected from the injector 12 (, becomes shorter than the spray length L1 of single injection, for example, the spray length L becomes equal to or shorter than 50% of the spray length L1. Thus, the spray length L of split injection is favorably suppressed, resulting in a reduction in the adherence of soot to the piston crown surface 103a.

(7) The interval setting unit 305B sets the target time interval $\Delta ta$ in a range equal to or greater than $\Delta t2$ (e.g., 0.8 ms) and equal to or smaller than $\Delta t4$ (e.g., 2.0 ms) (FIG. 24). Thus, the spray length is limited to L2, and injection in the fuel injection-prohibited area AR11 (FIG. 21) is prevented, resulting in favorable suppression of adherence of soot.

(8) The interval setting unit 305B sets the target time interval $\Delta ta$ such that the fuel is injected from the injector 12 in the injectable area AR12 at the injection frequency set by the frequency setting unit 305A. Specifically, the interval setting unit 305B sets the target time interval $\Delta ta$ in a range from $\Delta t2$ to $\Delta t4$ such that the injection frequency requirement is satisfied. Thus, the target time interval $\Delta ta$ is set such that the spray length L is reduced while the amount of one injection of the injector 12 is minimized, resulting in effective suppression of adherence of soot.

(9) If the in-cylinder temperature determination unit 303C determines that warm-up in the cylinder 102 is not complete, that is, if the injection mode is the adherence reduction mode M3, the injector control unit 305 controls the injector 12 so that the fuel is injected in the injectable area AR12 at the target time intervals $\Delta ta$ multiple times set by the frequency setting unit 305A. Thus, opportunities of injecting the fuel multiple times at the target time intervals $\Delta ta$ are limited, allowing an operation in a high combustion efficiency mode to be performed as frequently as possible.

Figure 26:
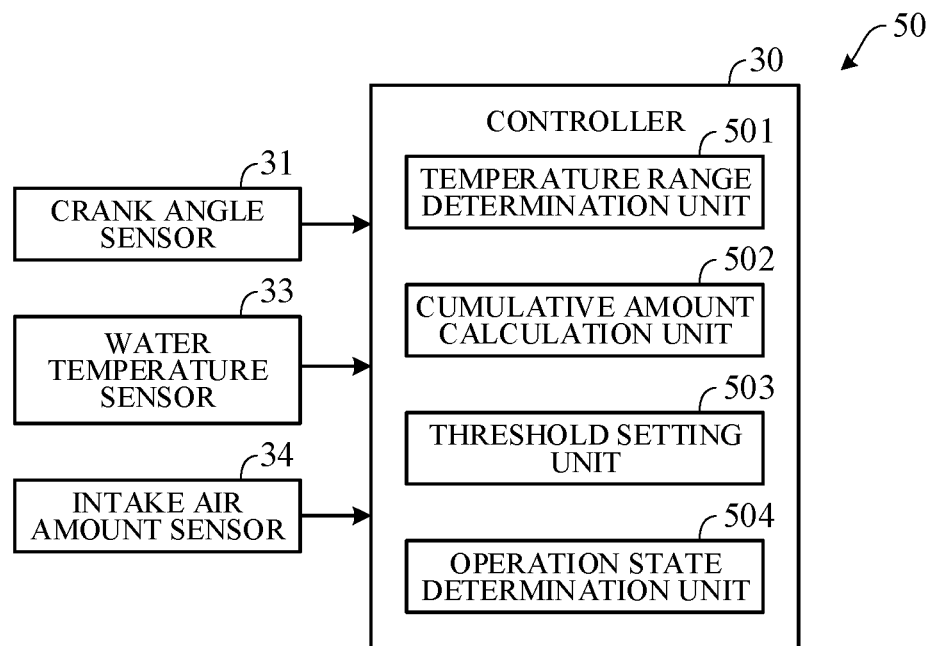
FIG. 26 is an block diagram showing a main configuration of a temperature acquisition unit, which is a more concrete form of the configuration of the in-cylinder temperature determination unit.

The configuration of the in-cylinder temperature determination unit 303C of FIG. 6 will be described in more detail. FIG. 26 is a block diagram showing the configuration of main components of a temperature acquisition unit 50, which is a more concrete form of the configuration of the in-cylinder temperature determination unit 303C. The temperature acquisition unit 50 is configured by the controller 30 and various types of sensors. Specifically, as shown in FIG. 26, the temperature acquisition unit 50 includes the crank angle sensor 31, water temperature sensor 33, and intake air amount sensor 34 connected to the controller 30. The controller 30 forming a part of the temperature acquisition unit includes, as functional elements, a temperature range determination unit 501, a cumulative amount calculation unit 502, a threshold setting unit 503, and an operation state determination unit 504.

The operation state determination unit 504 determines the operation state of the engine 1. Specifically, the operation state determination unit 504 determines whether the engine 1 is in a normal mode, in which the engine performs air intake and fuel injection, the F/C mode, in which the engine performs only air intake, a cold start mode, in which the engine starts from a cold state, or an operation stop mode (EV mode or I/S mode), in which the engine stops air intake and fuel injection.

The temperature range determination unit 501 determines whether the temperature Tp of the piston crown surface 103a (FIG. 2) is a high in-cylinder temperature equal to or greater than a predetermined temperature Tp0 (e.g., 100° C.), on the basis of the workload of the engine 1 (in-cylinder warm-up determination). In the case of a gasoline engine, the output (power) of the engine 1 has a correlation with the amount of intake air G, and the workload (total workload) of the engine 1 has a correlation with the cumulative amount $\Sigma G$ of the amount of intake air G. Since the cylinder 102 and piston 103 forming the combustion chamber 105 have heat capacities corresponding to the respective materials and masses, raising the temperature of these components requires a predetermined amounts of heat, that is, a predetermined workloads corresponding to the respective heat capacities.

Figure 27:
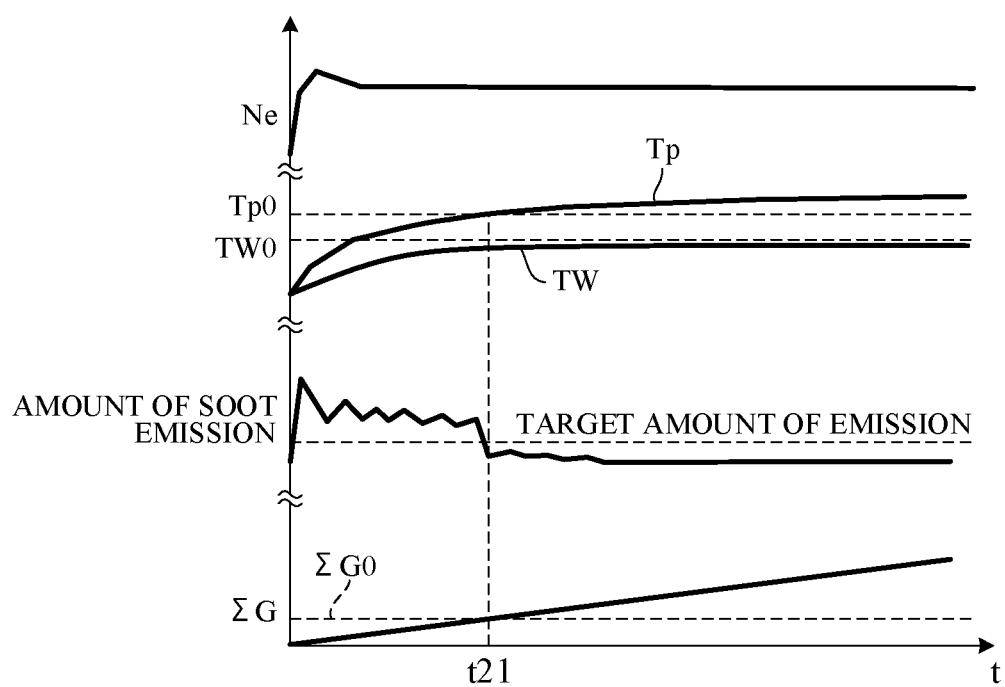
FIG. 27 is a diagram showing a characteristic in a temperature rise of a piston crown surface.

FIG. 27 is a diagram showing increases in the temperature of the piston crown surface 103a and shows an example of temporal changes in soot emission measured using a measurement instrument when warming up the engine 1 in a cold state. In FIG. 27, the temperature Tp of the piston crown surface 103a is an estimated value, and the cooling water temperature TW is a value detected by the water temperature sensor 33. The cumulative amount $\Sigma G$ of the amounts of intake air G is a value calculated by the cumulative amount calculation unit 502 on the basis of the amount of intake air G detected by the intake air amount sensor 34.

As shown in FIG. 27, in the cold state of the engine 1, the temperature of the entire engine 1 including the piston crown surface 103a and engine cooling water is uniform. The cold state of the engine 1 can be represented by the engine cooling water temperature TW detected by the water temperature sensor 33 at the start of the engine 1. During warm-up of the engine 1, the cumulative amount $\Sigma G$ (the amount of heat or workload generated by combustion) of the amount of intake air G is increased and thus the temperature Tp of the piston crown surface 103a is increased. The increases in the temperature Tp of the piston crown surface 103a cause gradual warm-up of the entire engine 1 including the piston crown surface 103a from the combustion chamber 105 side and thus increases the engine cooling water temperature TW. The warmed-up engine 1 is cooled by the engine cooling water that maintains its temperature TW at a predetermined temperature TW0 (e.g., 90° C.) or less by passing through a radiator (not shown).

As shown in FIG. 27, the amount of soot emission is approximately constant until time t21 and is sharply reduced at time t21 and falls below the target amount of emission. This will be described below. As shown in FIG. 2, the fuel injected from the injector 12 adheres to the piston crown surface 103a (recess 103b). If the temperature Tp of the piston crown surface 103a has already reached the predetermined temperature Tp0 (e.g., 100° C.), the adhering fuel immediately evaporates and therefore soot is less likely to occur. On the other hand, if the temperature Tp of the piston crown surface 103a has not reached the predetermined temperature Tp0, the adhering fuel is burnt incompletely and therefore soot is more likely to occur.

By conducting a soot emission amount check test as shown in FIG. 27, the cumulative amount (threshold) $\Sigma G\mathbf{0}$ of the amounts of intake air G required for the temperature Tp of the piston crown surface 103a to rise from the engine cooling water temperature TW at the start of the engine 1 to the predetermined temperature Tp0 is grasped in advance. The temperature range determination unit 501 determines whether the cumulative amount $\Sigma G$ of the amounts of intake air G is equal to or greater than the threshold $\Sigma G\mathbf{0}$. If the temperature range determination unit 501 determines that the cumulative amount $\Sigma G$ is equal to or greater than the threshold $\Sigma G\mathbf{0}$, it is determined that the in-cylinder temperature is a high in-cylinder temperature. Thus, it is determined whether the temperature Tp of the piston crown surface 103a has reached the predetermined temperature Tp0, without having to directly detect the temperature Tp of the piston crown surface 103a using a sensor.

The threshold $\Sigma G\mathbf{0}$ as shown in FIG. 27 varies with the cold state of the engine 1, that is, the cooling water temperature TW at the start of the engine 1. Specifically, the threshold $\Sigma G\mathbf{0}$ of the cumulative amount $\Sigma G$ of the amount of intake air G required for the in-cylinder temperature to reach a high in-cylinder temperature becomes larger as the cooling water temperature TW at the start of the engine 1 is lower; the threshold $\Sigma G\mathbf{0}$ becomes smaller as the cooling water temperature TW is higher. The characteristics of the threshold $\Sigma G\mathbf{0}$ with respect to the cooling water temperature TW at the start of the engine 1 are previously stored in the memory. The threshold setting unit 503 sets the threshold $\Sigma G\mathbf{0}$ in accordance with the characteristics previously stored in the memory. By determining the relative magnitudes of the threshold $\Sigma G\mathbf{0}$ thus set and the cumulative threshold $\Sigma G$ of the amounts of intake air G, the in-cylinder temperature determination unit 303C (temperature acquisition unit 50) determines whether the piston temperature is a low in-cylinder temperature or high in-cylinder temperature. Thus, the controller 30 is able to switch the injection mode to one suitable for a low piston temperature range or one suitable for a high piston temperature range.

While, in the above embodiment, the injector 12 serving as a fuel injector is mounted on the cylinder head 104 so as to be oriented obliquely downward, the fuel injector may be configured otherwise as long as it injects the fuel into the combustion chamber in the cylinder. While, in the above embodiment, it is determined whether the start of the engine 1 is complete, on the basis of signals from the crank angle sensor 31, a start determination unit may be configured otherwise. While, in the above embodiment, it is determined whether warm-up of the catalyst device 13 is needed, on the basis of whether the target total workload corresponding to the cooling water temperature of the engine 1 is 0, a catalyst warm-up determination unit may be configured otherwise and may determine whether catalyst warm-up is needed, using another parameter.

In the above embodiment, the injection mode switching unit 301 switches the injection mode from the start mode M1 to one of the catalyst warm-up mode M2, in which the ignition timing is fixed and the fuel is injected by two-injection intake, the adherence reduction mode M3, in which the fuel is injected one to four times in the injectable area in a range from the second half of the intake stroke to the first half of the compression stroke, and the homogeneity improvement mode M4, in which the fuel is injected once or twice in the intake stroke. Specifically, if the start determination unit 303A determines that the start of the engine 1 is complete and then the catalyst warm-up determination unit 303B determines that catalyst warm-up is needed, the injection mode is switched to the catalyst warm-up mode M2 (a first injection mode); if the start determination unit 303A determines that the start of the engine 1 is complete and then the catalyst warm-up determination unit 303B determines that catalyst warm-up is not needed, the injection mode is switched to the adherence reduction mode M3 (a second injection mode) or the homogeneity improvement mode M4

(a third injection mode) in accordance with temperature information acquired by the temperature information acquisition unit 302. However, an injection mode switching unit may be configured otherwise and the first to third injection modes also may be configured otherwise. For example, if the start determination unit 303A determines that the start of the engine 1 is complete and simultaneously the catalyst warm-up determination unit 303B determines that catalyst warm-up is needed, the injection mode may be switched to the first injection mode; if the start determination unit 303A determines that the start of the engine 1 is complete and simultaneously the catalyst warm-up determination unit 303B determines that catalyst warm-up is not needed, the injection mode may be switched to the second injection mode or third injection mode in accordance with temperature information acquired by the temperature information acquisition unit 302.

While, in the above embodiment, the injector control unit 305 controls the injector 12 so that the fuel is injected in accordance with the injection mode switched by the injection mode switching unit 301 (an injection mode switching unit), an injector control unit may be configured otherwise. While, in the above embodiment, information on the in-cylinder temperature, which influences adherence of soot in the cylinder 102, is acquired on the basis of signals from the intake air amount sensor 34, a temperature information acquisition unit may be configured otherwise as long as it acquires information on the temperature in the cylinder, in particular, information on the temperature having a correlation with the piston crown surface 103a. While, in the above embodiment, the in-cylinder temperature determination unit 303C determines whether the in-cylinder temperature is equal to or higher than the predetermined value, on the basis of temperature information acquired by the temperature information acquisition unit 302, a cylinder warm-up determination unit may be configured otherwise as long as it determines whether warm-up in the cylinder 102 is complete.

While, in the above embodiment, the engine speed is detected on the basis of signals from the crank angle sensor 31, the rotational speed detector may be configured otherwise. In the above embodiment, the injection pattern in the adherence reduction mode M3 is determined in accordance with the map (FIG. 5) representing the relationship between the engine speed Ne and the target amount of injection Q determined in accordance with the amount of intake air G detected by the intake air amount sensor 34, and the injection pattern in the homogeneity improvement mode M4 is determined in accordance with the map (FIG. 4) representing the relationship between the engine speed Ne and the amount of intake air G detected by the intake air amount sensor 34. That is, the engine output torque is detected on the basis of signals from the intake air amount sensor 34. However, the engine output torque may be detected on the basis of the amount of fuel injection, engine displacement, throttle opening, intake pressure, supercharging pressure, or the like. Accordingly, a torque detector may be configured otherwise as long as it detects an engine output torque or a physical quantity having a correlation with the engine output torque.

While, in the above embodiment, the maximum injection frequency in the adherence reduction mode M3 is set to four times and the maximum injection frequency in the homogeneity improvement mode M4 is set to twice, the maximum injection frequency are not limited to those described above as long as the maximum injection frequency in the adherence reduction mode M3 is higher than the maximum injection frequency in the homogeneity improvement mode M4. For example, the maximum injection frequency in the homogeneity improvement mode M4 may be three times. While, in the above embodiment, the knock determination unit 303D determines whether the injection mode needs to be switched to the multi-injection intake-compression knock suppression mode M5 (a fourth injection mode), a knock determination unit may be configured otherwise as long as it determines whether the injection mode needs to be switched to a mode in which knocks are suppressed.

While, in the above embodiment, the fuel is injected in the first half of the intake stroke and the second half of the compression stroke in the knock suppression mode M5, the fourth injection mode may be configured otherwise as long as the fuel is injected in a manner (a fourth manner) different from the injection manner (a first manner) in the catalyst warm-up mode M2, the injection manner (a second manner) in the adherence reduction mode M3, and the injection manner (a third manner) in the homogeneity improvement mode M4 such that knocks are suppressed.

The invention can be also configured as a control method for an internal combustion engine, the internal combustion engine including a piston reciprocating in a cylinder and a fuel injector arranged to inject a fuel into a combustion chamber facing the piston in the cylinder, i.e., the method including: determining whether a start of the internal combustion engine is complete; determining whether a warm-up of an exhaust catalyst device disposed on an exhaust passage of the internal combustion engine is needed; acquiring an information on a temperature inside the cylinder; switching an injection mode to one of a first injection mode injecting the fuel in a first manner to warm-up the exhaust catalyst device, a second injection mode injecting the fuel in a second manner different from the first manner, a third injection mode injecting the fuel in a third manner different from the first manner and the second manner; and controlling the fuel injector to inject the fuel in accordance with the injection mode, wherein the switching includes switching the injection mode to the first injection mode when it is determined that the start of the internal combustion engine is complete and it is determined that the warm-up of the exhaust catalyst device is needed, and switching the injection mode to the second injection mode or the third injection mode in accordance with the information on the temperature when it is determined that the start of the internal combustion engine is complete and it is determined that the warm-up of the exhaust catalyst device is not needed.

The above embodiment can be combined as desired with one or more of the above modifications. The modifications can also be combined with one another.

According to the present invention, it is possible to favorably suppress an adherence of soot to a piston crown surface or the like is, even if a warm-up of the catalyst is not required.

Above, while the present invention has been described with reference to the preferred embodiments thereof, it will be understood, by those skilled in the art, that various changes and modifications may be made thereto without departing from the scope of the appended claims.

What is claimed is:

1. A control apparatus for an internal combustion engine, the internal combustion engine including a piston reciprocating in a cylinder and a fuel injector arranged to inject a fuel into a combustion chamber facing the piston in the cylinder, the apparatus comprising an electronic control unit having a microprocessor and a memory, wherein the microprocessor is configured to perform:
  determining whether a start of the internal combustion engine is complete;
  determining whether a warm-up of an exhaust catalyst device disposed on an exhaust passage of the internal combustion engine is needed;
  acquiring information on a temperature inside the cylinder;
  switching an injection mode to one of a first injection mode injecting the fuel in a first manner to warm-up the exhaust catalyst device, a second injection mode injecting the fuel in a second manner different from the first manner, a third injection mode injecting the fuel in a third manner different from the first manner and the second manner; and
  controlling the fuel injector to inject the fuel in accordance with the injection mode, and wherein
the microprocessor is configured to perform
the switching including switching the injection mode to the first injection mode when it is determined that the start of the internal combustion engine is complete and it is determined that the warm-up of the exhaust catalyst device is needed, and switching the injection mode to the second injection mode or the third injection mode in accordance with the information on the temperature when it is determined that the start of the internal combustion engine is complete and it is determined that the warm-up of the exhaust catalyst device is not needed.

2. The apparatus according to claim 1, wherein
the microprocessor is configured to further perform
determining whether the temperature inside the cylinder is equal to or higher than a predetermined value based on the information on the temperature, and wherein
the microprocessor is configured to perform
the switching including switching the injection mode to the second injection mode or the third injection mode in accordance with a result of a determination whether the temperature inside the cylinder is equal to or higher than the predetermined when it is determined that the start of the internal combustion engine is complete and it is determined that the warm-up of the exhaust catalyst device is not needed.

3. The apparatus according to claim 2, comprising:
a rotational speed detector configured to detect a rotational speed of the internal combustion engine; and
a torque detector configured to detect an output torque of the internal combustion engine or a physical quantity having a correlation with the output torque, wherein
the microprocessor is configured to perform
the controlling including controlling the fuel injector so as to inject the fuel once or multiple times in a predetermined area among from a start of an intake stroke to an end of a compression stroke of the internal combustion engine in accordance with the rotational speed detected by the rotational speed detector and the output torque or the physical quantity detected by the torque detector when the injection mode is the second injection mode, and inject the fuel once or multiple times in the intake stroke in accordance with the rotational speed detected by the rotational speed detector and the output torque or the physical quantity detected by the torque detector when the injection mode is the third injection mode.

4. The apparatus according to claim 3, wherein
a maximum injection frequency of the fuel injected in the predetermined area in the second injection mode is greater than a maximum injection frequency of the fuel injected in the intake stroke in the third injection mode.

5. The apparatus according to claim 1, wherein
the microprocessor is configured to further perform
determining whether the injection mode needs to be switched to a fourth injection mode in which an occurrence of knocking of the internal combustion engine is suppressed, and wherein
the microprocessor is configured to perform
the switching including switching the injection mode to the fourth injection mode injecting the fuel in a fourth manner different from the first manner, the second manner and the third manner when it is determined that the injection mode needs to be switched to the fourth injection mode from the second injection mode or the third injection mode.

6. The apparatus according to claim 5, wherein
the microprocessor is configured to perform
the controlling including controlling the fuel injector so as to inject the fuel in each of an intake stroke and a compression stroke of the internal combustion engine in the fourth injection mode, and
an injection amount of the fuel in the compression stroke in the fourth injection mode is less than the injection amount of the fuel in the intake stroke in the fourth injection mode.

7. The apparatus according to claim 6, wherein
the injection amount of the fuel in the compression stroke in the fourth injection mode is a minimum injection amount of the fuel capable of injecting at one time with the fuel injector.

8. The apparatus according to claim 7, wherein
the microprocessor is configured to further perform
calculating a target injection amount of the fuel in each of the intake stroke and the compression stroke in the fourth injection mode, and wherein
the microprocessor is configured to perform
the switching including switching the injection mode from the fourth injection mode to the third injection mode when the target injection amount of the fuel in the compression stroke is equal to or less than the minimum injection amount of the fuel.

9. A control apparatus for an internal combustion engine, the internal combustion engine including a piston reciprocating in a cylinder and a fuel injector arranged to inject a fuel into a combustion chamber facing the piston in the cylinder, the apparatus comprising
an electronic control unit having a microprocessor and a memory, wherein
the microprocessor is configured to function as:
  a start determination unit determining whether a start of the internal combustion engine is complete;
  a catalyst warm-up determination unit determining whether a warm-up of an exhaust catalyst device disposed on an exhaust passage of the internal combustion engine is needed;
  a temperature information acquisition unit acquiring information on a temperature inside the cylinder;
  an injection mode switching unit switching an injection mode to one of a first injection mode injecting the fuel in a first manner to warm-up the exhaust catalyst device, a second injection mode injecting the fuel in a second manner different from the first manner, a third injection mode injecting the fuel in a third manner different from the first manner and the second manner; and an injector control unit controlling the fuel injector to inject the fuel in accordance with the injection mode switched by the injection mode switching unit, and the injection mode switching unit is configured to switch the injection mode to the first injection mode when it is determined by the start determination unit that the start of the internal combustion engine is complete and it is determined by the catalyst warm-up determination unit that the warm-up of the exhaust catalyst device is needed, and switch the injection mode to the second injection mode or the third injection mode in accordance with the information on the temperature acquired by the temperature information acquisition unit when it is determined by the start determination unit that the start of the internal combustion engine is complete and it is determined by the catalyst warm-up determination unit that the warm-up of the exhaust catalyst device is not needed.

10. The apparatus according to claim 9, wherein
the microprocessor is configured to further function as
an in-cylinder temperature determination unit determining whether the temperature inside the cylinder is equal to or higher than a predetermined value based on the information on the temperature acquired by the temperature information acquisition unit, and the injection mode switching unit is configured to switch the injection mode to the second injection mode or the third injection mode in accordance with a determination result by the in-cylinder temperature determination unit when it is determined by the start determination unit that the start of the internal combustion engine is complete and it is determined by the catalyst warm-up determination unit that the warm-up of the exhaust catalyst device is not needed.

11. The apparatus according to claim 10, comprising:
a rotational speed detector configured to detect a rotational speed of the internal combustion engine; and
a torque detector configured to detect an output torque of the internal combustion engine or a physical quantity having a correlation with the output torque, wherein the injector control unit is configured to control the fuel injector so as to inject the fuel once or multiple times in a predetermined area among from a start of an intake stroke to an end of a compression stroke of the internal combustion engine in accordance with the rotational speed detected by the rotational speed detector and the output torque or the physical quantity detected by the torque detector when the injection mode is the second injection mode, and inject the fuel once or multiple times in the intake stroke in accordance with the rotational speed detected by the rotational speed detector and the output torque or the physical quantity detected by the torque detector when the injection mode is the third injection mode.

12. The apparatus according to claim 11, wherein
a maximum injection frequency of the fuel injected in the predetermined area in the second injection mode is greater than a maximum injection frequency of the fuel injected in the intake stroke in the third injection mode.

13. The apparatus according to claim 9, wherein
the microprocessor is configured to further function as
a knock determination unit determining whether the injection mode needs to be switched to a fourth injection mode in which an occurrence of knocking of the internal combustion engine is suppressed, and the injection mode switching unit is configured to switch the injection mode to the fourth injection mode injecting the fuel in a fourth manner different from the first manner, the second manner and the third manner when it is determined by the knock determination unit that the injection mode needs to be switched to the fourth injection mode from the second injection mode or the third injection mode.

14. The apparatus according to claim 13, wherein
the injector control unit is configured to control the fuel injector so as to inject the fuel in each of an intake stroke and a compression stroke of the internal combustion engine in the fourth injection mode, and an injection amount of the fuel in the compression stroke in the fourth injection mode is less than the injection amount of the fuel in the intake stroke in the fourth injection mode.

15. The apparatus according to claim 14, wherein
the injection amount of the fuel in the compression stroke in the fourth injection mode is a minimum injection amount of the fuel capable of injecting at one time with the fuel injector.

16. The apparatus according to claim 15, wherein
the microprocessor is configured to further function as
an injection amount calculation unit calculating a target injection amount of the fuel in each of the intake stroke and the compression stroke in the fourth injection mode, and the injection mode switching unit is configured to switch the injection mode from the fourth injection mode to the third injection mode when the target injection amount of the fuel in the compression stroke calculated by the injection amount calculation unit is equal to or less than the minimum injection amount of the fuel.

17. A control method for an internal combustion engine, the internal combustion engine including a piston reciprocating in a cylinder and a fuel injector arranged to inject a fuel into a combustion chamber facing the piston in the cylinder, the method comprising determining whether a start of the internal combustion engine is complete;

determining whether a warm-up of an exhaust catalyst device disposed on an exhaust passage of the internal combustion engine is needed;

acquiring information on a temperature inside the cylinder;

switching an injection mode to one of a first injection mode injecting the fuel in a first manner to warm-up the exhaust catalyst device, a second injection mode injecting the fuel in a second manner different from the first manner, a third injection mode injecting the fuel in a third manner different from the first manner and the second manner; and controlling the fuel injector to inject the fuel in accordance with the injection mode, wherein the switching includes switching the injection mode to the first injection mode when it is determined that the start of the internal combustion engine is complete and it is determined that the warm-up of the exhaust catalyst device is needed, and switching the injection mode to the second injection mode or the third injection mode in accordance with the information on the temperature when it is determined that the start of the internal combustion engine is complete and it is determined that the warm-up of the exhaust catalyst device is not needed.

* * * * *